(12) United States Patent
Armstrong et al.

(10) Patent No.: US 10,265,643 B2
(45) Date of Patent: Apr. 23, 2019

(54) HIGH EFFICIENCY, ULTRA-STABLE, BONDED HYDROPHILIC INTERACTION CHROMATOGRAPHY (HILIC) MATRIX ON SUPERFICIALLY POROUS PARTICLES (SPPS)

(71) Applicant: AZYP, LLC, Arlington, TX (US)

(72) Inventors: Daniel W. Armstrong, Arlington, TX (US); Zachry S. Breitbach, Arlington, TX (US)

(73) Assignee: AZYP, LLC, Arlington, TX (US)

( * ) Notice: Subject to any disclaimer, the term of this patent is extended or adjusted under 35 U.S.C. 154(b) by 0 days.

(21) Appl. No.: 15/326,927

(22) PCT Filed: Jul. 17, 2015

(86) PCT No.: PCT/US2015/041028
§ 371 (c)(1),
(2) Date: Jan. 17, 2017

(87) PCT Pub. No.: WO2016/011427
PCT Pub. Date: Jan. 21, 2016

(65) Prior Publication Data
US 2017/0203234 A1  Jul. 20, 2017

Related U.S. Application Data

(60) Provisional application No. 62/025,990, filed on Jul. 17, 2014.

(51) Int. Cl.
| | | |
|---|---|---|
| *B01D 15/38* | (2006.01) | |
| *B01D 15/30* | (2006.01) | |
| *B01J 20/288* | (2006.01) | |
| *B01J 20/28* | (2006.01) | |
| *B01J 20/289* | (2006.01) | |
| *B01J 20/32* | (2006.01) | |
| *B01J 20/10* | (2006.01) | |
| *B01J 20/22* | (2006.01) | |
| *B01J 20/24* | (2006.01) | |
| *B01J 20/283* | (2006.01) | |
| *B01J 20/29* | (2006.01) | |

(52) U.S. Cl.
CPC .......... *B01D 15/305* (2013.01); *B01J 20/103* (2013.01); *B01J 20/22* (2013.01); *B01J 20/24* (2013.01); *B01J 20/283* (2013.01); *B01J 20/28004* (2013.01); *B01J 20/288* (2013.01); *B01J 20/289* (2013.01); *B01J 20/28061* (2013.01); *B01J 20/28078* (2013.01); *B01J 20/28083* (2013.01); *B01J 20/29* (2013.01); *B01J 20/3204* (2013.01); *B01J 20/3217* (2013.01); *B01J 20/3219* (2013.01); *B01J 20/3263* (2013.01); *B01J 20/3285* (2013.01); *B01J 20/3293* (2013.01); *B01J 2220/46* (2013.01); *B01J 2220/54* (2013.01)

(58) Field of Classification Search
CPC ...... B01D 15/38; B01D 15/3833; B01J 20/24; B01J 20/103
USPC ....................................................... 502/402
See application file for complete search history.

(56) References Cited

U.S. PATENT DOCUMENTS

| | | |
|---|---|---|
| 2012/0226054 A1 | 9/2012 | Miller et al. |
| 2013/0112605 A1 | 5/2013 | Wyndham et al. |
| 2013/0324700 A1 | 12/2013 | Liang et al. |
| 2014/0021136 A1 | 1/2014 | Qiu et al. |
| 2014/0083946 A1 | 3/2014 | Andrei |

FOREIGN PATENT DOCUMENTS

WO   2013173501 A2   11/2013

OTHER PUBLICATIONS

Supplementary European Search Report dated Jan. 31, 2018 for corresponding European Application No. EP 15 82 1602.
M.E.A. Ibrahim, et al; Hybrid carbon nanoparticles modified core-shell silica: A high efficiency carbon-based phase . . . ; Analytica Chimica Acta; vol. 820; Apr. 2014; 3 pages.
J.J. DeStefano, et al; Performance characteristics of new superficially porous particles; J. Chromatogr. A; vol. 1258; Oct. 2012; 10 pages.
International Search Report dated Oct. 20, 2015 for PCT/US2015/041028.
Written Opinion dated Oct. 20, 2015 for PCT/US2015/041028.

*Primary Examiner* — Edward M Johnson
(74) *Attorney, Agent, or Firm* — Lucas & Mercanti, LLP

(57) ABSTRACT

The present invention relates to superficially porous particles (SPPs), also called core-shell, porous shell or fused core particles, which are state-of-the-art support materials used in the production of HPLC columns. Hydrolytically stable, highly selective superficially porous particle (SPP) hydrophilic interaction liquid chromatographic (HILIC) stationary phases having higher efficiencies and shorter retention times than analogous stationary phases on fully porous particles (FPP) is provided.

16 Claims, 27 Drawing Sheets

Diameter = 1.7 μm

Diameter = 2.7 μm

Diameter = 4.0 μm

| L = linker type (examples) | R = derivative group (examples) |
|---|---|
| Ether | Hydrogen |
| Carbamate | Linear alkane $C_1$-$C_{30}$ |
| Thioether | Branched alkane $C_1$-$C_{30}$ |
| Thiocarbamate | Unsaturated alkane $C_1$-$C_{30}$ |
| Ester | Cyclic alkane $C_1$-$C_{30}$ |
| Triazole | Cyclic or linear alkane with heteroatoms (e.g. N, S, O) $C_1$-$C_{30}$ |

| L = linker type (examples) | R = derivative group (examples) |
|---|---|
| Ether | Hydrogen |
| Carbamate | Linear alkane $C_1$-$C_{30}$ |
| Thioether | Branched alkane $C_1$-$C_{30}$ |
| Thiocarbamate | Unsaturated alkane $C_1$-$C_{30}$ |
| Ester | Cyclic alkane $C_1$-$C_{30}$ |
| Triazole | Cyclic or linear alkane with heteroatoms (e.g. N, S, O) $C_1$-$C_{30}$ |

FIG. 5 (cont'd)

> \> 200,000 plates/meter
> Reduced plate height h = 1.7

Single Amino acid polymorphism - Enkephalins

1- [D-Ala2,D-Leu5]-Enkephalin
   Tyr-D-Ala-Gly-Phe-D-Leu
2- Met-Enkephalin [D-Ala2]
   Tyr-D-Ala-Gly-Phe-Met
3- Met-Enkephalin
   Tyr-Gly-Gly-Phe-Met
4- [D-Ala2,Leu5]-Enkephalin
   Tyr-D-Ala-Gly-Phe-Leu
5- Leu-Enkephalin
   Tyr-Gly-Gly-Phe-leu
6- [D-Ala2,Leu5]-Enkephalin
   Tyr-Ala-Gly-Phe-Leu

HIGH EFFICIENCY, ULTRA-STABLE, BONDED HYDROPHILIC INTERACTION CHROMATOGRAPHY (HILIC) MATRIX ON SUPERFICIALLY POROUS PARTICLES (SPPS)

CROSS-REFERENCE TO RELATED APPLICATIONS

This Application is a 371 of PCT/US2015/041028 filed on Jul. 17, 2015, which claims priority of U.S. Provisional Application No. 62/025,990 filed Jul. 17, 2014, both of which are incorporated herein by reference.

SUMMARY OF THE INVENTION

The present invention relates to superficially porous particles (SPPs), also called core-shell, porous shell or fused core particles, which are state-of-the-art support materials used in the production of HPLC columns.

Historically, the concept of shell particles was firstly proposed by Horvath et al. during the 1960s and they were developed as ion exchange materials for the analysis of large biological molecules. See, e.g., J. J. Destefano, T. J. Langlois and J. J. Kirkland, J. Chromatogr Sci. 46 (2008) 254, X. L. Wang, W. E. Barber and W. J. Long, J. Chromatogr. A. 1228 (2012) 72, F. Gritti and G. Guiochon, LCGC North America. 7 (2012) 586 and C. G. Horvath, B. A. Preiss and S. R. Lipsky, Anal Chem. 39 (1967) 1422, the contents of each of which are incorporated herein by reference.

SPP technology was advanced by Kirkland, who prepared 50 µm particles in the 1970s and 5 µm particles in the 1990s. See e.g., J. J. Kirkland, Anal Chem. 41 (1969) 218, J. J. Kirkland, Anal Chem. 43 (1971) A36 and J. J. Kirkland, Anal Chem. 64 (1992) 1239, the contents of each of which are incorporated by reference.

Concurrent improvements in the manufacturing of high-quality fully porous particles (FPP) inhibited the manufacture, application, and use of SPPs. See e.g., B. Chauve, D. Guillarme, P. Cleon and J. L. Veuthey, J Sep Sci. 33 (2010) 752, the contents of which is incorporated by reference. FPPs with diameters of 3 µm (1990s) and sub-2 µm (2004) came in vogue along with liquid chromatographs that could operate at higher pressures (i.e., 1000 bar). However, recent improvements to SPP technology have moved them to the forefront of HPLC packing materials. For example, columns are now available with SPP sizes of 1.7, 2.6 or 2.7 µm and porous shell thicknesses of 0.23, 0.35 and 0.5 µm, respectively. See, e.g., S. Fekete, E. Olah and J. Fekete, J. Chromatogr. A. 1228 (2012) 57, the contents of which is incorporated herein by reference.

This generation of SPP markedly improved chromatographic performance, due its morphology, which consists of a solid inner core surrounded by a porous layer. See, e.g., FIG. 1. SPPs are able to decrease all contributions to band broadening including those from longitudinal diffusion, eddy dispersion and stationary phase mass transfer contributions. The presence of the solid core leads a to shorter path for analytes to travel and decreases band broadening caused by poor mass transfer leading to the ability to carry analysis out under high flow rates without a significant loss in efficiency. Further, SPPs are generally produced with very narrow particle size distributions and decrease band broadening due to eddy diffusion. Columns packed with superficially porous particles have been used for high throughput separations by improving efficiency while keeping methods robust. See, e.g., A. Periat, I. Kohler, J. L. Veuthey and D. Guillarme, LCGC Europe. 5 (2013) 17, the contents of which is incorporated herein by reference.

In recent years, the number of publications involving HPLC columns based on SPPs has increased. See, e.g. J. Ruta, D. Zurlino, C. Grivel, S. Heinisch, J. L. Veuthey and D. Guillarme, Journal of Chromatography A. 1228 (2012) 221, J. J. Kirkland, S. A. Schuster, W. L. Johnson and B. E. Boyes, Journal of Pharmaceutical Analysis. 3 (2013) 303, D. V. McCalley, J. Chromatogr. A. 1193 (2008) 85, E. Olah, S. Fekete, J. Fekete and K. Ganzler, J. Chromatogr. A. 1217 (2010) 3642, F. Gritti, A. D. Pereira, P. Sandra and G. Guiochon, J. Chromatogr. A. 1217 (2010) 683 and F. Gritti, I. Leonardis, D. Shock, P. Stevenson, A. Shalliker and G. Guiochon, Journal of Chromatography A. 1217 (2010) 1589, the contents of each of which are incorporated herein by reference.

Many to relatively few SPP HILIC columns can be purchased from different companies, but the vast majority of the marketed HILIC packing material is simply unmodified silica. See, e.g. Fekete, E. Olah and J. Fekete, J. Chromatogr. A. 1228 (2012) 57. Silica gel does not always offer acceptable HILIC separations. See e.g., H. X. Qiu, L. Loukotkova, P. Sun, E. Tesarova, Z. Bosakova and D. W. Armstrong, J. Chromatogr. A. 1218 (2011) 270 and H. Qiu, et al., J. Chromatogr. A. 1218 (2011) 8075-8082, the contents of each of which are incorporated herein by reference.

Furthermore it is not stable when utilized with the water containing mobile phases necessary for HILIC separations. This instability manifests itself by the slow dissolution of the underlying silica and the ever changing retention of the separated analytes (see Table 1 in Experimental). This is completely unacceptable for a commercial HILIC stationary phase. Further this trend is even more critical for SPPs. Thus, it is both timely and important to produce and evaluate newer, more promising, HILIC separating agents on SPP supports (see, e.g. FIGS. 1-3). As is shown, this is accomplished by using ultra stable, covalently bonded HILIC phases that both protect the surface from dissolution and have broader HILIC selectivities and higher efficiencies than bare supports like silica or other unprotected or less protected supports.

DETAILED DESCRIPTION OF THE INVENTION

Figure 1:
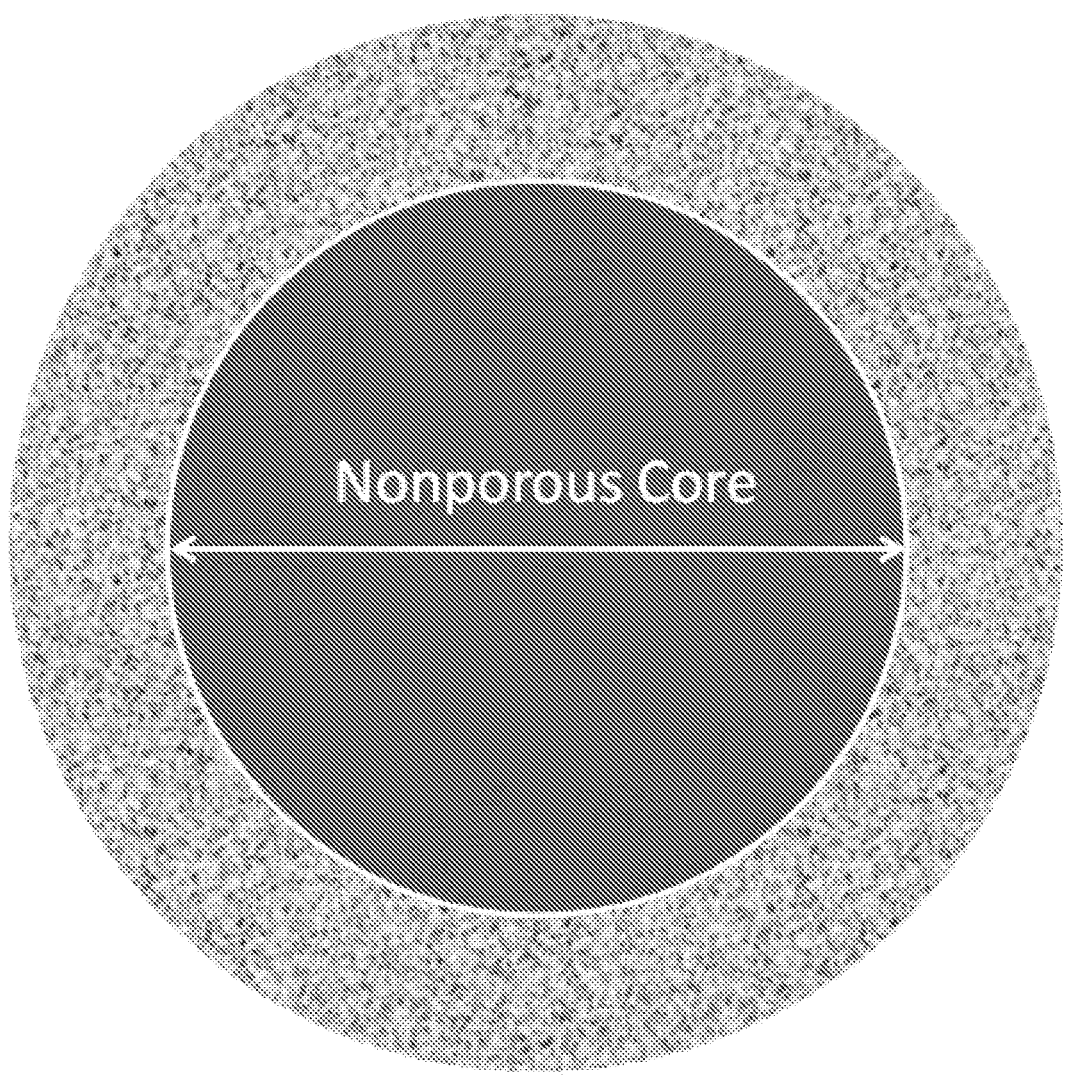
FIG. 1: schematic showing of a superficially porous particle (SPP), a.k.a. core-shell particle (nonporous core surrounded by porous shell).
Figure 2:
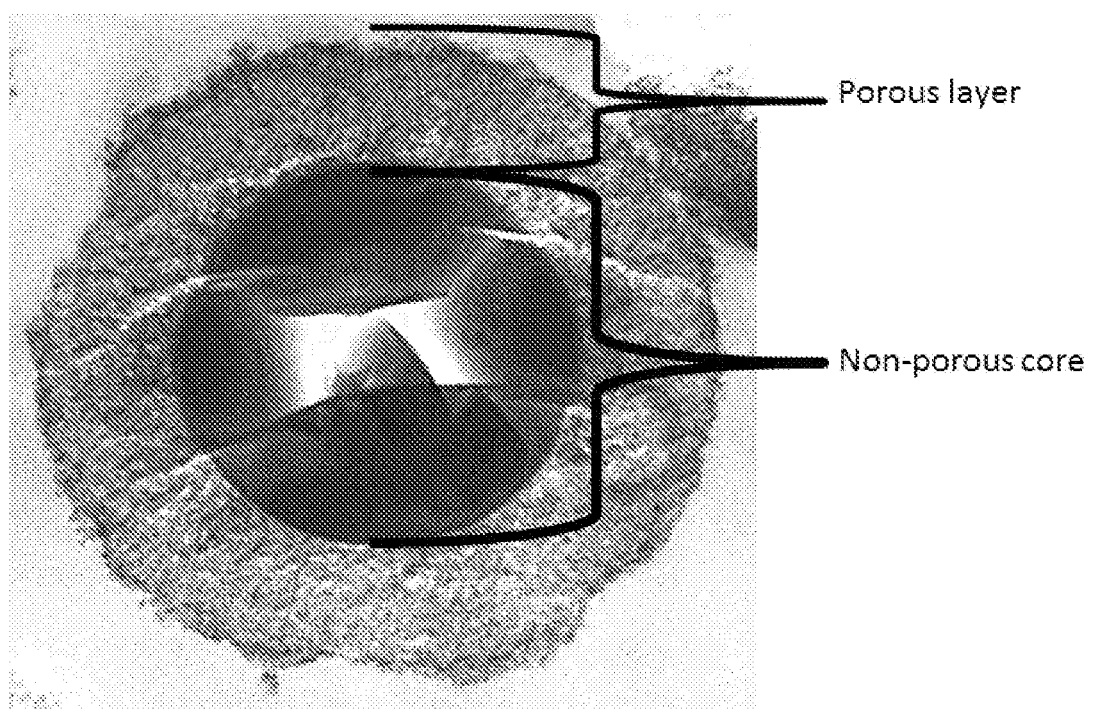
FIG. 2: transmission electron micrograph of a superficially porous particle. The ratio of the non-porous core diameter to the total particle diameter is defined as ρ.
Figure 3:
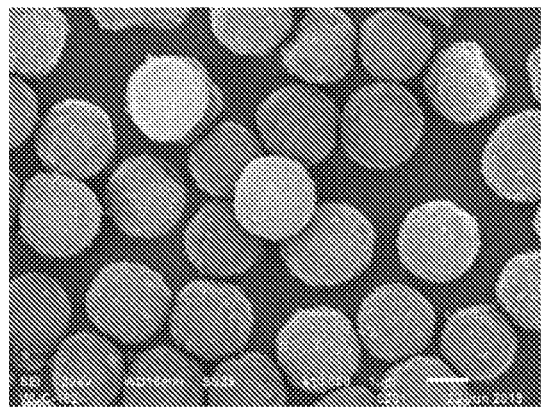
FIG. 3: scanning electron micrographs of examples of 3 different diameter superficially porous particles.
Figure 3:
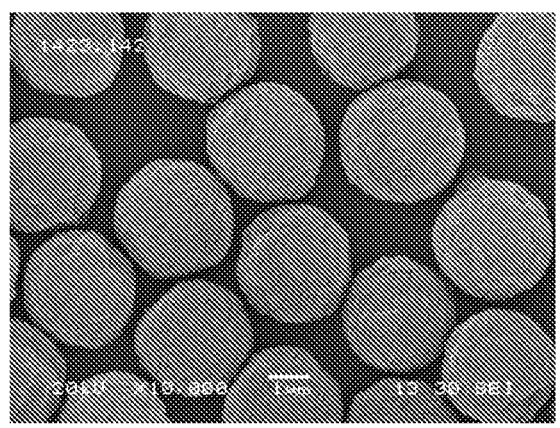
Figure 3:
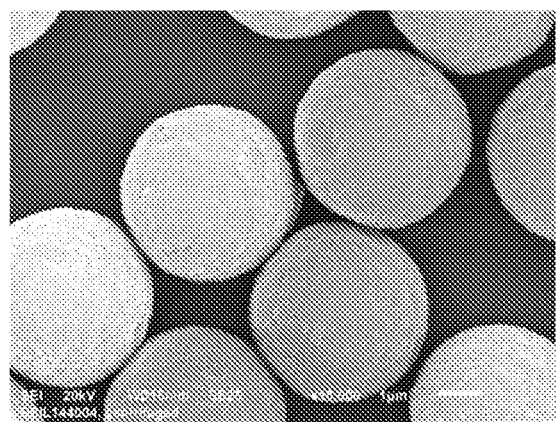
Figure 4:
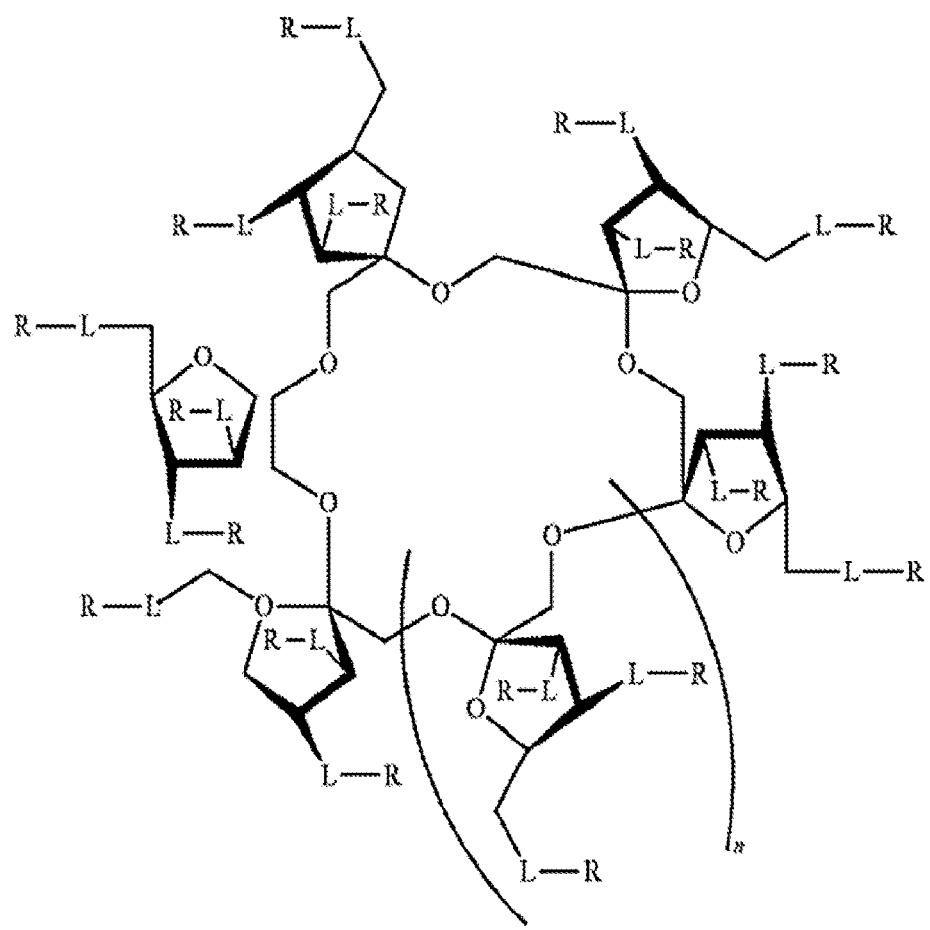
FIG. 4: examples of cyclofructans and cyclofructan derivatives.
Figure 5:
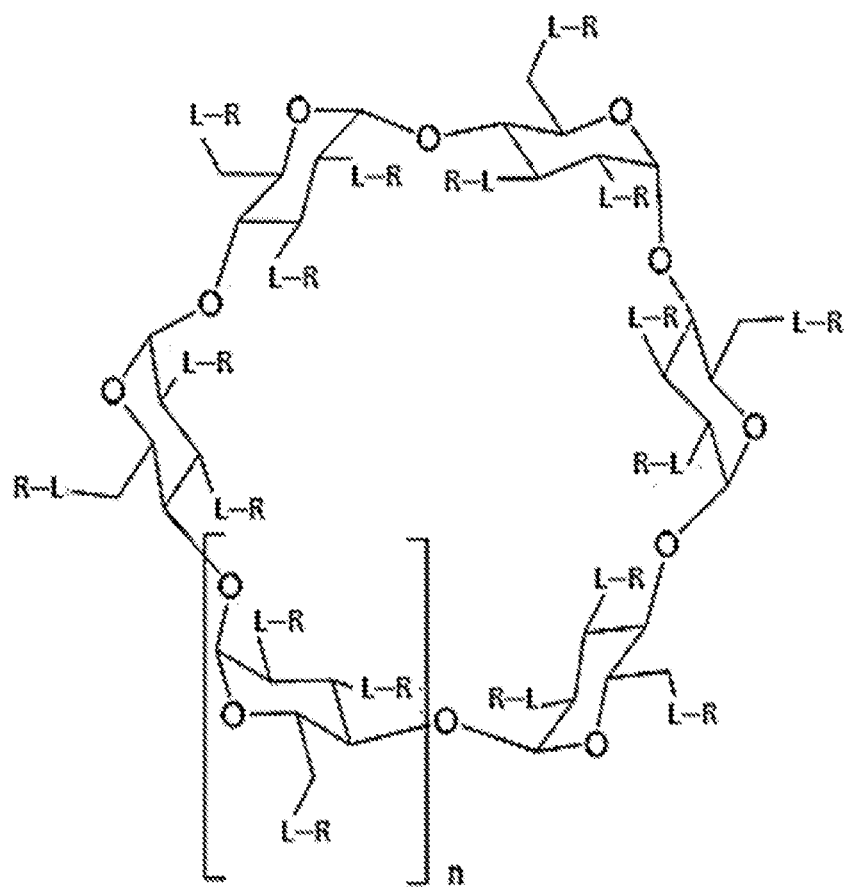
FIG. 5: examples of cyclodextrins and cyclodextrin derivatives.
Figure 6:
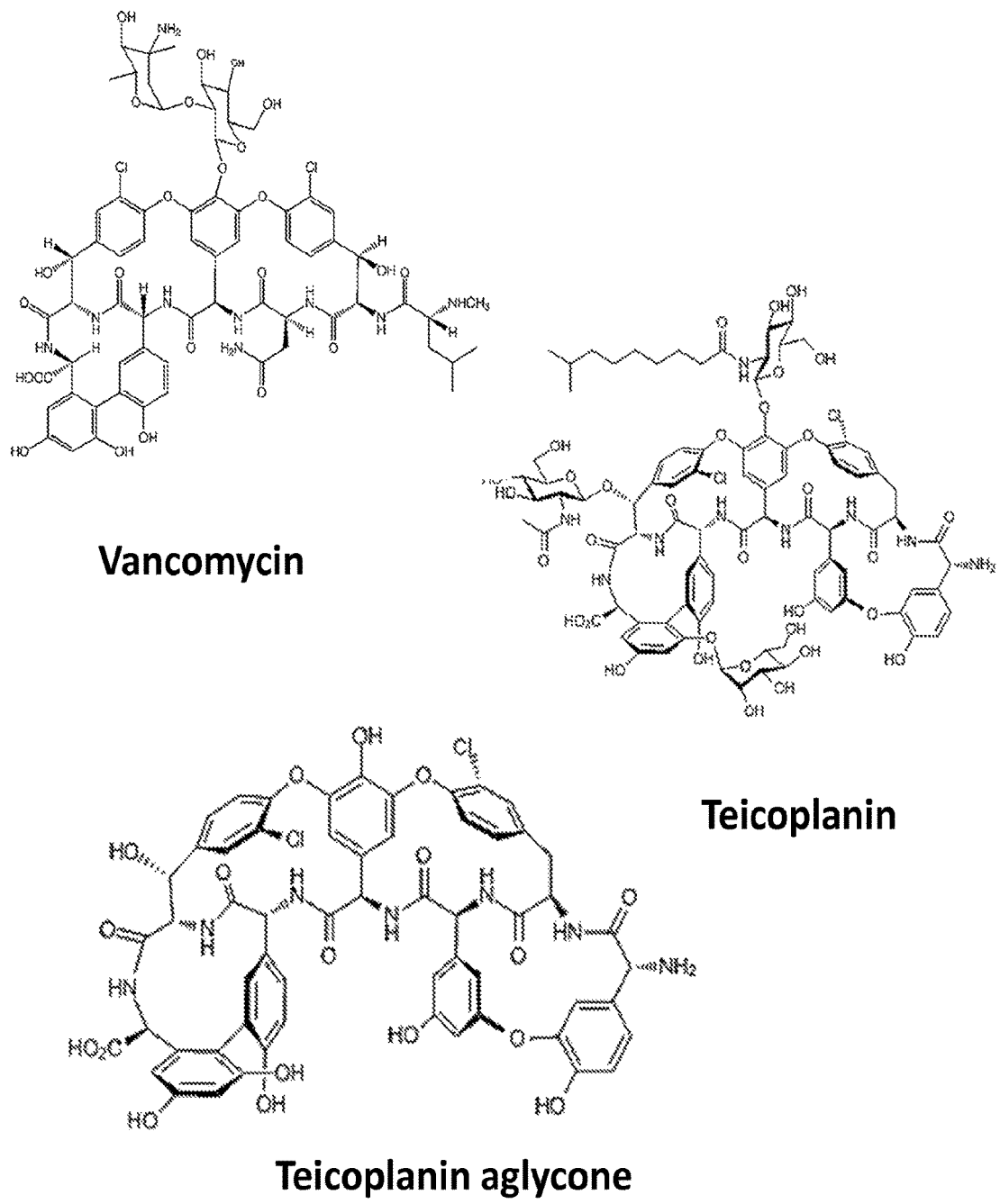
FIG. 6: examples of macrocyclic glycopeptides.
Figure 7:
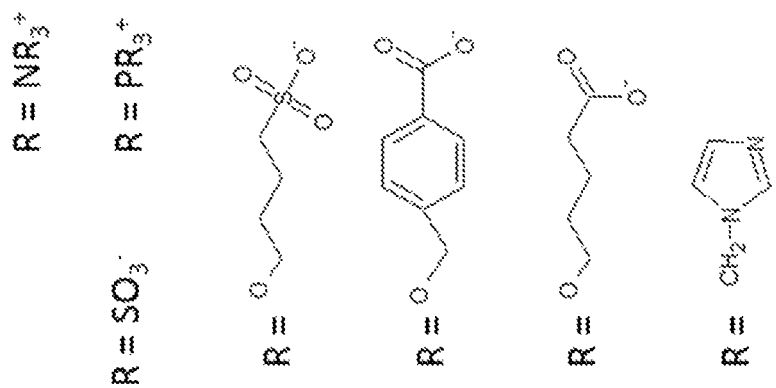
FIG. 7: examples of ionic HILIC selectors.
Figure 7:
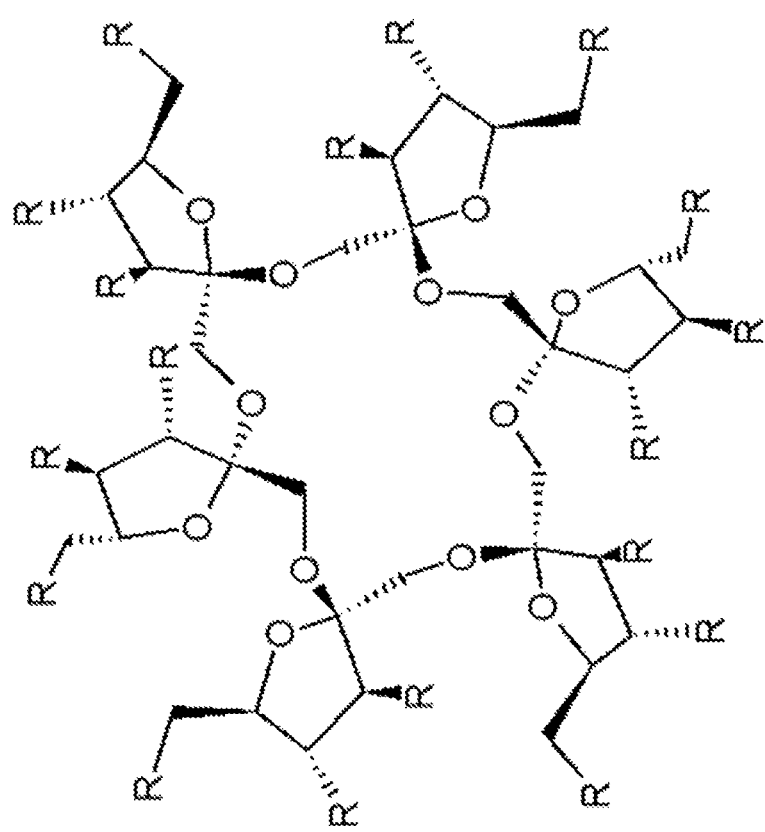
Figure 8:
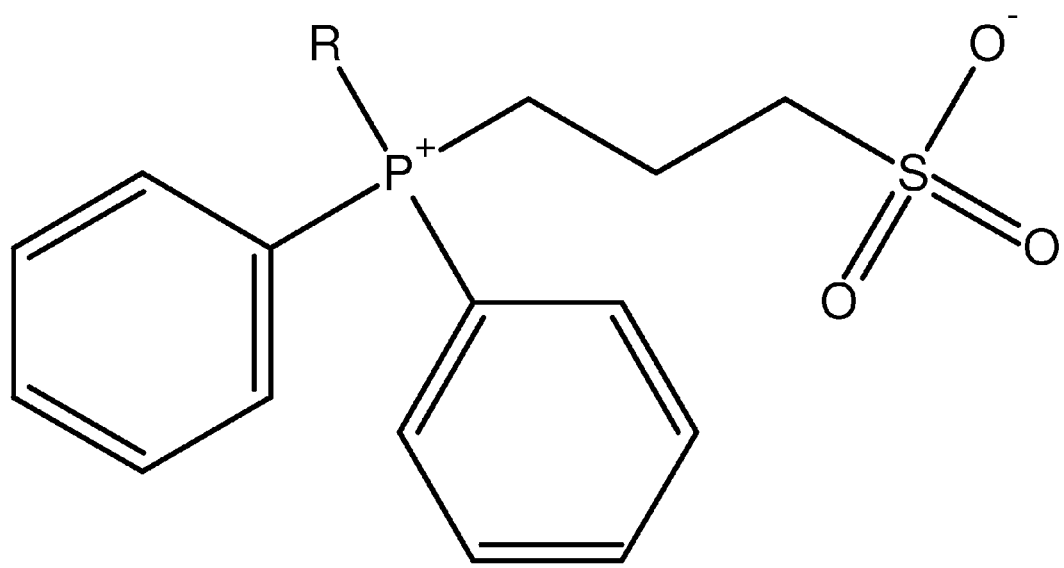
FIG. 8: examples of a zwitterionic HILIC selector.

In the present application, HILIC stationary phases based on native and derivatized cyclofructans, cyclodextrins, macrocyclic antibiotics and zwitterions were evaluated for selectivity and stability when bonded to SPPs as the support material (see FIG. 1-3). The columns were also tested in the normal phase (NP) mode, to evaluate the influence of aqueous and non-aqueous containing mobile phases in performance. Results in terms of stability, efficiency, analysis time and resolution were evaluated, demonstrating clear advantages of the new HILIC columns based on SPPs.

Further, such HILIC bonded SPPs can be produced on SPPs that range in size from about 0.5 to about 20 micron in total particle diameter, preferably from about 1.3 to about 10 micron, more preferably from about 1.7 to about 5.0 micron. SPP-CSPs according to the invention can be produced on SPPs having total particle diameter of, for example, about 0.5 micron, about 0.6 micron, about 0.7 micron, about 0.8 micron, about 0.9 micron, about 1.0 micron, about 1.1 micron, about 1.2 micron, about 1.3 micron, about 1.4 micron, and so on. Scanning electron micrographs of some particles, e.g. about 1.7, about 2.7 and about 4.0 micron, are shown in FIG. 3.

Native cyclofructan-6 (CF6) has been reported to be a powerful selector in separation of polar compounds in the HILIC mode. The column based on CF6 chemically bonded to FPP is commercially available (FRULIC-N) and it has demonstrated advantages over popular commercial columns in separating several compounds such as nucleic acid bases, nucleosides, nucleotides, xanthines, β-blockers, carbohydrates, etc.

Likewise, cyclodextrins and derivatized cyclodextrins (CDs) are shown to make exceptional HILIC phases. Two other types of bonded HILIC selectors included are the zwitterionic types (i.e., those containing both cationic and anionic moieties) and the macrocyclic antibiotic types like vancomycin. See, e.g. R. J. Soukup-Hein, et al. Chromatographia 66 (2007) 461 and U.S. Pat. No. 4,539,399, the contents of each of which are incorporated herein by reference. Table 1 list the classes of HILIC selectors which are presented in this application. Representative/example structures for each class of HILIC selector are shown in FIG. 4-8.

TABLE 1 list of the classes and types of HILIC selectors.
FIGS. 4-8 provide structures.

| Bonded bush-type HILIC Selector Class | Examples of HILIC Selectors |
|---|---|
| Carbohydrates, oligosaccharides, cyclic oligosaccharides, and their derivatives | Cyclodextrins<br>Derivatized cyclodextrin<br>Cyclofructans<br>Derivatized cyclofructans |
| Peptides, glycopeptides-macrocyclic glycopeptides, and their derivatives | Teicoplanin<br>Vancomycin<br>Teicoplanin aglycone<br>Ristocetin A<br>Dalbavancin<br>Boromycin |
| Ionic | Sulfonated cyclofructans and cyclodextrins |
| Zwiterionic | 3-P,P-diphenyl-phosphoniumpropylsulfonate |

The present invention provides for the preparation of the first hydrolytically stable, covalently bonded, highly selective SPP HILIC stationary phases. Further these SPP HILIC stationary phases have higher efficiencies and shorter retention times than the analogous stationary phases on fully porous particles (FFPs)

EXAMPLES

Anhydrous N,N-dimethylformamide (DMF), anhydrous toluene, anhydrous pyridine, 3-(triethoxysilyl)propylisocyanate, ammonium acetate ($NH_4OAc$), trifluoracetic acid (TFA) and all analytes tested in this work (5-phenylvaleric acid, ferulic acid, pyridoxine, L-ascorbic acid, uracil, adenosine, cytosine, thymidine 3':5'cyclic monophosphate (cTMP), adenosine 2':3'cyclic monophosphate (cAMP), guanosine 2':3'cyclic monophosphate (cGMP), and cytidine 2':3'cyclic monophosphate (cCMP) were purchased from Sigma-Aldrich (Milwaukee, Wis.). The 1,2-bis(trichlorosilyl)ethane was obtained from Aldrich. The 1,3-bis(chlorodimethylsilyl))propane and bis (3-trimethoxysilylpropyl)amine were obtained from Gelest (Morrisville, Pa.). The CF6, cyclodextrins and macrocyclic glycopeptides were provided by AZYP, LLC (Arlington, Tex.). Acetonitrile (ACN), heptane (Hep), isopropyl alcohol (IPA) and ethanol (EtOH), used for the chromatographic separations, were obtained from EMD (Gibbstown, N.J.). Water was purified by a Milli-Q Water Purification System (Millipore, Billerica, Mass.).

All the chromatographic separations were conducted on an Agilent HPLC series 1260 system (Agilent Technologies, Santa Clara, Calif.), equipped with a quaternary pump, an autosampler and a multiwavelength UV-Vis detector. For data acquisition and analysis, the Chemstation software version Rev. B.03.02 [341] was used. The injection volume was 0.5 μL for all analyses. The temperature was maintained at 30° C. The mobile phases (MP) used in the HILIC mode were composed of 75-95% of ACN and 5-25% of 25 mM $NH_4OAc$, except for the cyclic nucleotides, for which the MP was composed of ACN/100 mM $NH_4OAc$ (70/30, v/v). For the separations carried out in the normal phase, Hep/IPA and Hep/EtOH in different ratios were used and 0.1% of TFA was added to the EtOH phase for the analysis of ferulic acid.

Native CF6 was chemically bonded to silica gel according to the disclosure of H. X. Qiu, L. Loukotkova, P. Sun, E. Tesarova, Z. Bosakova and D. W. Armstrong, J. Chromatogr. A. 1218 (2011) 270. The cyclodextrin based CSPs were synthesized according to D. W. Armstrong as disclosed in U.S. Pat. No. 4,539,399. The macrocyclic antibiotic CSP were synthesized according to D. W. Armstrong as disclosed in U.S. Pat. No. 5,626,757, the content of which is incorporated herein by reference. The zwitterionic stationary phases were synthesized according to the disclosure of Qiu, et al., Journal of Chromatography A 1218 (2011) 8075-8082.

The following examples are syntheses for the preparation of a variety of stable, bonded, superficially porous particle (SPP) based HILIC stationary phases.

Example 1

Preparation of Cyclofructan Based Stable, Bonded, SPP HILIC Stationary Phases

Cyclofructans are cyclic oligosaccharides that possess 18-24 hydroxyl groups. These hydroxyl groups can be used as reactive functionalities to covalently bond the cyclofructan (or cyclofructan derivative) to SPP silica. Cyclofructans can be used as HILIC selectors in their native form or in a derivatized format. Derivatization of the cyclofructan molecules can take place before or after they are immobilized on the SPP silica. The derivatizing groups are typically, but not limited to: linear alkane $C_1$-$C_{30}$, branched alkane $C_1$-$C_{30}$, unsaturated alkane $C_1$-$C_{30}$, cyclic alkane $C_1$-$C_{30}$, linear and/or cyclic alkane containing heteroatoms (e.g. N, S, O) $C_1$-$C_{30}$) and are bonded to the cyclofructan by a number of chemical linkages (e.g. ether, carbamate, thioether, thiocarbamate, ester, triazole, and urea).

Native and derivatized cyclofructans are linked to SPP silica in the same way. First, in a 250 mL round-bottom flask cyclofructan (3 mmol) was dissolved in anhydrous DMF (60 mL) under and argon blanket. Then, 3-triethoxysilylpropyl isocyanate (12 mmol) and anhydrous pyridine (5 mL) were added and the reaction vessel was heated to 90° C. for 5 hours. Meanwhile, the SPP silica (4 grams) was first dried in an oven (120° C.) for 4 hours and later azeotropically distilled (toluene, 125 mL) using a Dean-stark trap and a 250 mL, 2-neck round-bottom flask. Once both reaction vessels were allowed to cool to room temperature, the cyclofructan/DMF solution was added to the SPP silica-toluene slurry, and the resulting suspension was refluxed for 16 hours. After that time, the reaction was filtered and washed (toluene, dichloromethane, isopropanol, methanol, water, acetone). This method gives a carbamate linked cyclofructan HILIC phase. The resulting SPP HILIC phase was dried and subsequently slurry packed into a stainless steel tube. Alternatively, a second binding chemistry which also forms a carbamate linker can be employed. Here, SPP silica (3 grams) was dried at 120° C. for 4 hours. Next, toluene was added and residual water was removed using a Dean-stark trap to azeotropically distill the toluene-SPP silica slurry. The suspension was allowed to cool (<40° C.) and 1 mL of (3-aminopropyl)triethoxysilane was added to the silica (3.3 grams)-toluene (125 mL) slurry and the reaction mixture was refluxed for 4 hours. After which, the suspension was filtered, washed (toluene, dichloromethane, isopropanol, methanol, water, acetone), and dried to yield the amino-functionalized SPP silica. Then, 1,6-diisocyanatohexane (2 mL) was added to a dry amino-silica toluene slurry (under argon), which was cooled with an ice bath. After all the diisocyanate was added, the reaction mixture was heated to 70° C. for 5 hours. After this time, the suspension was filtered, washed (toluene) and finally re-suspended in toluene (anhydrous, 125 mL) and TEA (10 mL). Finally, cyclofructan (1 mmol) was dissolved in anhydrous DMF (25 mL) and the solution was added to the SPP silica suspension and the resulting slurry was refluxed for 16 hours. After that time, the reaction was filtered and washed (toluene, dichloromethane, isopropanol, methanol, water, acetone). This method gives a carbamate and urea linked cyclofructan HILIC phase. The resulting SPP HILIC phase was dried and subsequently slurry packed into a stainless steel tube.

A third bonding strategy will give an example of how cyclofructan and its derivatives can be immobilized with an ether linkage. First, in a 500 mL round-bottom flask cyclofructan (10 mmol) was dissolved in 300 mL of anhydrous DMF under and argon blanket. Then, 1 gram of NaH was added to the solution and the resulting suspension was stirred in an inert environment at room temperature for 30 minutes. Next, any unreacted NaH was filtered off and the filtrate was transferred to a clean, dry, 500 mL round-bottom flask to which 8 mL of 3-glycidoxypropyl trimethoxysilane was added. This solution was heated to 90° C. for 5 hours and then allowed to cool to room temperature. Next, the solution was transferred to a 500 mL 2-neck round bottom flask containing dry SPP silica (21 grams) and the resulting suspension was heated to 110° C. for 16 hours. After that time, the reaction was filtered and washed (toluene, dichloromethane, isopropanol, methanol, water, acetone). The resulting SPP HILIC phase was dried and subsequently slurry packed into a stainless steel tube.

Example 2

Preparation of Cyclodextrin Based Stable, Bonded, SPP HILIC Stationary Phases

Cyclodextrins are cyclic oligosaccharides that possess 18-24 hydroxyl groups. These hydroxyl groups can be used as reactive functionalities to covalently bond the cyclodextrin (or cyclodextrin derivative) to SPP silica. Cyclodextrins can be used as HILIC selectors in their native form or in a derivatized format. Derivatization of the cyclodextrin molecules can take place before or after they are immobilized on the SPP silica. As was noted earlier, the derivatizing groups are typically, but not limited to: linear alkane $C_1$-$C_{30}$, branched alkane $C_1$-$C_{30}$, unsaturated alkane $C_1$-$C_{30}$, cyclic alkane $C_1$-$C_{30}$, linear and/or cyclic alkane containing heteroatoms (e.g. N, S, O) $C_1$-$C_{30}$) and are bonded to the cyclodextrin by a number of chemical linkages (e.g. ether, carbamate, thioether, thiocarbamate, ester, triazole, and urea) as noted earlier.

Native and derivatized cyclodextrins are linked to SPP silica in the same way. First, in a 250 mL round-bottom flask cyclodextrin (3 mmol) was dissolved in anhydrous DMF (60 mL) under and argon blanket. Then, 3-triethoxysilylpropyl isocyanate (12 mmol) and anhydrous pyridine (5 mL) were added and the reaction vessel was heated to 90° C. for 5 hours. Meanwhile, the SPP silica (4 grams) was first dried in an oven (120° C.) for 4 hours and later azeotropically distilled (toluene, 125 mL) using a Dean-stark trap and a 250 mL, 2-neck round-bottom flask. Once both reaction vessels were allowed to cool to room temperature, the cyclodextrin/DMF solution was added to the SPP silica-toluene slurry, and the resulting suspension was refluxed for 16 hours. After that time, the reaction was filtered and washed (toluene, dichloromethane, isopropanol, methanol, water, acetone). This method gives a carbamate linked cyclodextrin HILIC phase. The resulting SPP HILIC phase was dried and subsequently slurry packed into a stainless steel tube. Alternatively, a second binding chemistry which also forms a carbamate linker can be employed. Here, SPP silica (3 grams) was dried at 120° C. for 4 hours. Next, toluene was added and residual water was removed using a Dean-stark trap to azeotropically distill the toluene-SPP silica slurry. The suspension was allowed to cool (<40° C.) and 1 mL of (3-aminopropyl)triethoxysilane was added to the silica (3.3 grams)-toluene (125 mL) slurry and the reaction mixture was refluxed for 4 hours. After which, the suspension was filtered, washed (toluene, dichloromethane, isopropanol, methanol, water, acetone), and dried to yield the amino-functionalized SPP silica. Then, 1,6-diisocyanatohexane (2 mL) was added to a dry amino-silica toluene slurry (under argon), which was cooled with an ice bath. After all the diisocyanate was added, the reaction mixture was heated to 70° C. for 5 hours. After this time, the suspension was filtered, washed (toluene) and finally re-suspended in toluene (anhydrous, 125 mL) and TEA (10 mL). Finally, cyclodextrin (1 mmol) was dissolved in anhydrous DMF (25 mL) and the solution was added to the SPP silica suspension and the resulting slurry was refluxed for 16 hours. After that time, the reaction was filtered and washed (toluene, dichloromethane, isopropanol, methanol, water, acetone). This method gives a carbamate and urea linked cyclodextrin HILIC phase. The resulting SPP HILIC phase was dried and subsequently slurry packed into a stainless steel tube.

A third bonding strategy will give an example of how cyclodextrin and its derivatives can be immobilized with an ether linkage. First, in a 500 mL round-bottom flask cyclodextrin (10 mmol) was dissolved in 300 mL of anhydrous DMF under and argon blanket. Then, 1 gram of NaH was added to the solution and the resulting suspension was stirred in an inert environment at room temperature for 30 minutes. Next, any unreacted NaH was filtered off and the filtrate was transferred to a clean, dry, 500 mL round-bottom flask to which 8 mL of 3-glycidoxypropyl trimethoxysilane was added. This solution was heated to 90° C. for 5 hours and then allowed to cool to room temperature. Next, the solution was transferred to a 500 mL 2-neck round bottom flask containing dry SPP silica (21 grams) and the resulting suspension was heated to 110° C. for 16 hours. After that time, the reaction was filtered and washed (toluene, dichloromethane, isopropanol, methanol, water, acetone). The resulting SPP HILIC phase was dried and subsequently slurry packed into a stainless steel tube.

Example 3

Preparation of Glycopeptide Based Stable, Bonded, SPP HILIC Stationary Phases

Macrocyclic glycopeptides (e.g. teicoplanin, boromycin, ristocetin A, dalbavancin, and vancomycin) possess amine and hydroxyl functionalities which can be used as reactive groups to covalently bond the glycopeptide (or glycopeptide analog; e.g. teicoplanin aglycone) to SPP silica. There are a number of bonding chemistries that can be used to chemically immobilize macrocyclic glycopeptides on SPP silica (e.g. ether, carbamate, thioether, thiocarbamate, ester, triazole, and urea). The following lists example bonding strategies, using teicoplanin as the model HILIC selector.

First, in a 250 mL round-bottom flask teicoplanin (3 mmol) was dissolved in anhydrous DMF (60 mL) under and argon blanket and TEA (3 mL) was added. Then, 3-triethoxysilylpropyl isocyanate (12 mmol) was added and the reaction vessel was heated to 90° C. for 5 hours. Meanwhile, the SPP silica (4 grams) was first dried in an oven (120° C.) for 4 hours and later azeotropically distilled (toluene, 125 mL) using a Dean-stark trap and a 250 mL, 2-neck round-bottom flask. Once both reaction vessels were allowed to cool to room temperature, the teicoplanin/DMF solution was added to the SPP silica-toluene slurry, and the resulting suspension was refluxed for 16 hours. After that time, the reaction was filtered and washed (toluene, dichloromethane, isopropanol, methanol, water, acetone). This method gives a carbamate linked teicoplanin HILIC phase. The resulting SPP HILIC phase was dried and subsequently slurry packed into a stainless steel tube.

Alternatively, a second binding chemistry which also forms a carbamate linker can be employed. Here, SPP silica (3 g) was dried at 120° C. for 4 hours. Next, toluene was added and residual water was removed using a Dean-stark trap to azeotropically distill the toluene-SPP silica slurry. The suspension was allowed to cool (<40° C.) and 1 mL of (3-aminopropyl)triethoxysilane was added to the silica (3.3 grams)-toluene (125 mL) slurry and the reaction mixture was refluxed for 4 hours. After which, the suspension was filtered, washed (toluene, dichloromethane, isopropanol, methanol, water, acetone), and dried to yield the amino-functionalized SPP silica. Then, 1,6-diisocyanatohexane (2 mL) was added to a dry amino-silica toluene slurry (under argon), which was cooled with an ice bath. After all the diisocyanate was added, the reaction mixture was heated to 70° C. for 5 hours. After this time, the suspension was filtered, washed (toluene) and finally re-suspended in toluene (anhydrous, 125 mL) and TEA (10 mL) was added. Finally, teicoplanin (1 mmol) was dissolved in anhydrous DMF (25 mL) and the solution was added to the SPP silica suspension and the resulting slurry was refluxed for 16 hours. After that time, the reaction was filtered and washed (toluene, dichloromethane, isopropanol, methanol, water, acetone). This method gives a carbamate and urea linked teicoplanin HILIC phase. The resulting SPP HILIC phase was dried and subsequently slurry packed into a stainless steel tube.

A third bonding strategy will give an example of how teicoplanin and its derivatives can be immobilized with an ether linkage. First, in a 500 mL round-bottom flask teicoplanin (10 mmol) was dissolved in 300 mL of anhydrous DMF under and argon blanket. Then, 1 gram of NaH was added to the solution and the resulting suspension was stirred in an inert environment at room temperature for 30 minutes. Next, any unreacted NaH was filtered off and the filtrate was transferred to a clean, dry, 500 mL round-bottom flask to which 8 mL of 3-glycidoxypropyl trimethoxysilane was added. This solution was heated to 90° C. for 5 hours and then allowed to cool to room temperature. Next, the solution was transferred to a 500 mL 2-neck round bottom flask containing dry SPP silica (21 grams) and the resulting suspension was heated to 110° C. for 16 hours. After that time, the reaction was filtered and washed (toluene, dichloromethane, isopropanol, methanol, water, acetone). The resulting SPP HILIC phase was dried and subsequently slurry packed into a stainless steel tube.

Example 4

Preparation of Ionic Type Stable, Bonded, SPP HILIC Stationary Phases

Charged or ionic type stable, bonded, HILIC stationary phases can be made via a number of synthetic and binding techniques. Herein, sample derivatizing and binding strategies are given to produce an anionic cyclofructan based HILIC stationary phase that has been bonded to SPP silica through the use of multipoint attachment. The first model HILIC selector described is benzoic acid functionalized cyclofructan 6. This example represents a technique that can be used to produce and number of ionic SPP HILIC phases.

Benzoic acid derivatized cyclofructan 6 was produced and later bonded to SPP silica by any of the following binding methods. First, cyclofructan 6 (4.2 grams) as dissolved in 200 mL of anhydrous DMF at 75° C. and NaH (2.12 gram) was added. The suspension was stirred at 75° C. for 45 min. Then, methyl 4-(bromomethyl)benzoate (20 grams) was dissolved in anhydrous DMF (50 mL) and the solution was carefully added to the cyclofructan-NaH suspension and the reaction was heated to 75° C. for 20 hours, After which, the reaction was cooled and any solids were filtered. Solvent was removed from the filtrate to yield a yellowish crude material. The crude esterified product was then hydrolyzed to the carboxylic form using water, methanol, and sodium hydroxide. The derivatized cyclofructan was then linked to SPP silica. First, in a 250 mL round-bottom flask cyclofructan (3 mmol) was dissolved in anhydrous DMF (60 mL) under and argon blanket. Then, 3-triethoxysilylpropyl isocyanate (12 mmol) and anhydrous pyridine (5 mL) were added and the reaction vessel was heated to 90° C. for 5 hours. Meanwhile, the SPP silica (4 grams) was first dried in an oven (120° C.) for 4 hours and later azeotropically distilled (toluene, 125 mL) using a Dean-stark trap and a 250 mL, 2-neck round-bottom flask. Once both reaction vessels were allowed to cool to room temperature, the cyclofructan/DMF solution was added to the SPP silica-toluene slurry, and the resulting suspension was refluxed for 16 hours. After that time, the reaction was filtered and washed (toluene, dichloromethane, isopropanol, methanol, water, acetone). This method gives a carbamate linked cyclofructan HILIC phase. The resulting SPP HILIC phase was dried and subsequently slurry packed into a stainless steel tube.

Alternatively, a second binding chemistry which also forms a carbamate linker can be employed. Here, SPP silica (3 grams) was dried at 120° C. for 4 hours. Next, toluene was added and residual water was removed using a Dean-stark trap to azeotropically distill the toluene-SPP silica slurry. The suspension was allowed to cool (<40° C.) and 1 mL of (3-aminopropyl)triethoxysilane was added to the silica (3.3 grams)-toluene (125 mL) slurry and the reaction mixture was refluxed for 4 hours. After which, the suspension was filtered, washed (toluene, dichloromethane, isopropanol, methanol, water, acetone), and dried to yield the aminofunctionalized SPP silica. Then, 1,6-diisocyanatohexane (2 mL) was added to a dry amino-silica toluene slurry (under argon), which was cooled with an ice bath. After all the diisocyanate was added, the reaction mixture was heated to 70° C. for 5 hours. After this time, the suspension was filtered, washed (toluene) and finally re-suspended in toluene (anhydrous, 125 mL) and TEA (10 mL). Finally, cyclofructan (1 mmol) was dissolved in anhydrous DMF (25 mL) and the solution was added to the SPP silica suspension and the resulting slurry was refluxed for 16 hours. After that time, the reaction was filtered and washed (toluene, dichloromethane, isopropanol, methanol, water, acetone). This method gives a carbamate and urea linked cyclofructan HILIC phase. The resulting SPP HILIC phase was dried and subsequently slurry packed into a stainless steel tube.

A third bonding strategy will give an example of how cyclofructan and its derivatives can be immobilized with an ether linkage. First, in a 500 mL round-bottom flask cyclofructan (10 mmol) was dissolved in 300 mL of anhydrous DMF under and argon blanket. Then, 1 gram of NaH was added to the solution and the resulting suspension was stirred in an inert environment at room temperature for 30 minutes. Next, any unreacted NaH was filtered off and the filtrate was transferred to a clean, dry, 500 mL round-bottom flask to which 8 mL of 3-glycidoxypropyl trimethoxysilane was added. This solution was heated to 90° C. for 5 hours and then allowed to cool to room temperature. Next, the solution was transferred to a 500 mL 2-neck round bottom flask containing dry SPP silica (21 grams) and the resulting suspension was heated to 110° C. for 16 hours. After that time, the reaction was filtered and washed (toluene, dichloromethane, isopropanol, methanol, water, acetone). The resulting SPP HILIC phase was dried and subsequently slurry packed into a stainless steel tube.

Example 5

Preparation of Zwitterionic Type Stable, Bonded, SPP HILIC Stationary Phases Zwitterionic HILIC phases are hydrolytically unstable unless certain measures are taken to protect the HILIC ligand from leaching. There are several approaches to do this (as described earlier). In this example, a phosphoniumsulfonate zwitterion (3-P,P-diphenylphosphoniumpropylsulfonate) is chemically bonded to SPP silica in a stable format through the use of a bipodal silane. Specifically, in a 500 mL round-bottom flask, 25.8 mL of 0.5 M potassium diphenylphosphide was transferred under air-free conditions. Next, 120 mL of anhydrous THF was added while stirring the phosphide under argon. The phosphide was converted into the zwitterion by slowly adding 2.35 grams of propanesultone dissolved in 10 mL of anhydrous THF. The sultone was added drop by drop in 3.3 minutes. The resulting white suspension was kept in a freezer (to further precipitate the zwitterion). The white suspension was filtered under argon on glass frit funnel and washed with diethyl ether.

The resulting zwitterion (5.3 grams) was transferred to a 500 mL flask and dissolved in 60 mL of anhydrous DMF. When the solid dissolved completely, 2.3 g of 3-bromopropionic acid (in 10 mL DMF) was added and the mixture heated overnight at 100° C. After the reaction, the KBr was filtered and the resulting viscous liquid was rotary evaporated at 80° C. The brown liquid was washed with hot THF, ACN, and heptane. After overnight drying under vacuum, white crystals of 3-P,P-diphenylphosphinopropylsulfonate were obtained. In the next step, 5.24 grams of crude 3-P,P-diphenylphosphinopropylsulfonate was reacted with 1.55 grams of oxalyl chloride in anhydrous dichloromethane for 4 hours on crushed ice. The solvent was removed at room temperature in vacuo. The acylated product was immediately mixed with 4.1 grams of bis(3-trimethoxysilylpropyl)amine in anhydrous DMF. Hunig's base was added to absorb HCl. The resulting modified silane was refluxed with 7 grams of SPP silica in toluene, which was previously dried by azeotropic distillation with a Dean-Stark trap. The resulting SPP HILIC phase was dried and subsequently slurry packed into a stainless steel tube.

Figure 9:
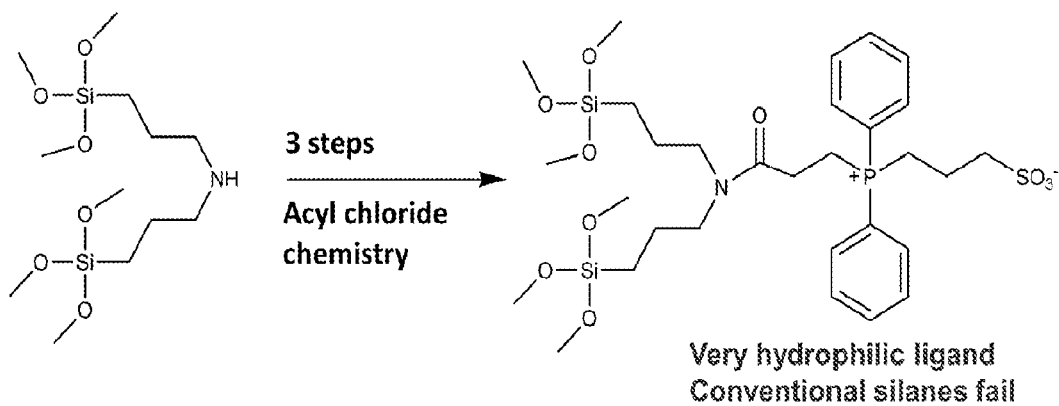
FIG. 9: example of the use of non-conventional silanes to form hydrolytically stable, high efficiency, bonded zwitterionic SPP HILIC phases.
Figure 10:
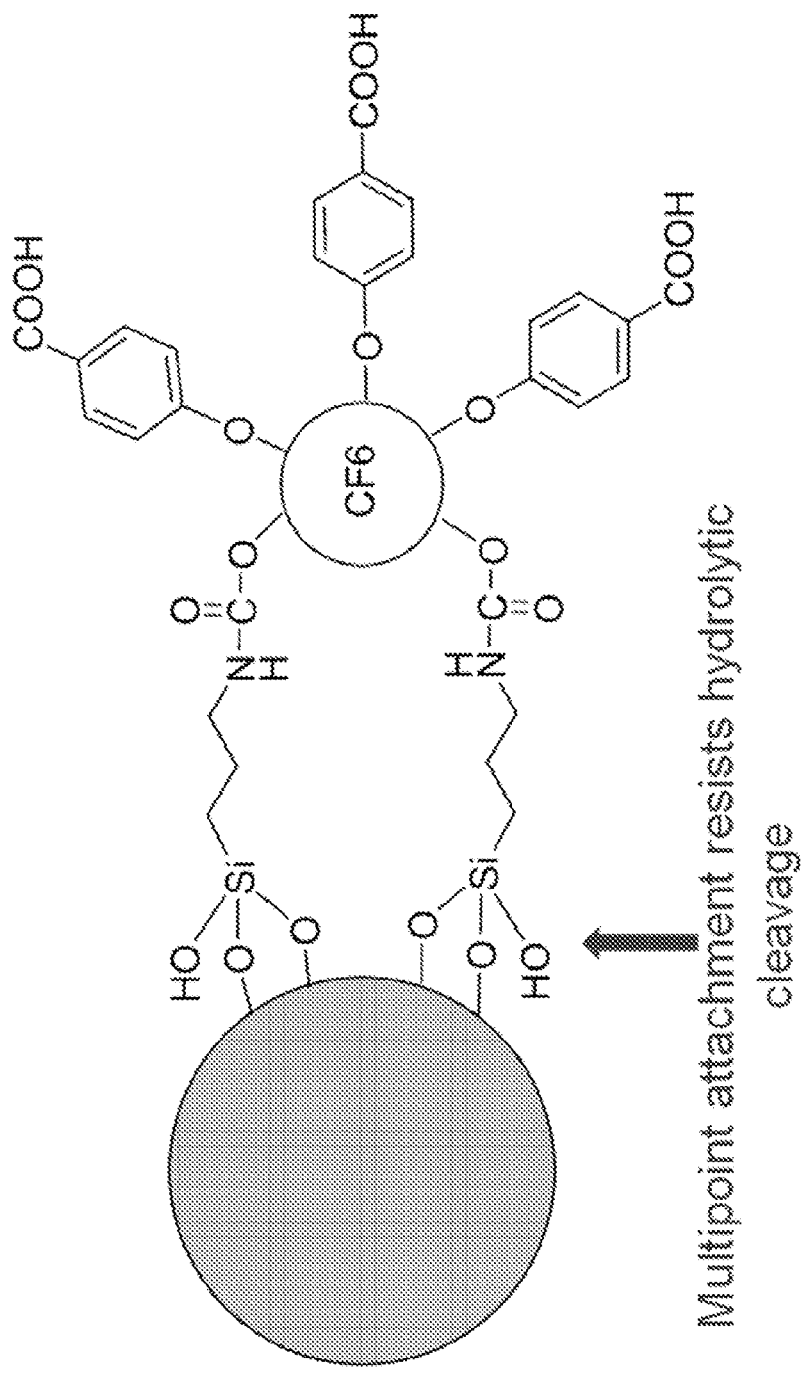
FIG. 10: example of the use of multipoint attachment to form hydrolytically stable, high efficiency, bonded ionic, derivatized cyclofructan, SPP HILIC phases.

Two schematics showing typical attachment strategies for stabilizing HILIC phases are shown in FIGS. 9 & 10. These combined with using HILIC selectors of sufficient steric bulk to protect the silica surface are essential for providing enhanced stability HILIC stationary phases.

Stability properties from the presented stabilization techniques are listed in Table 2.

TABLE 2

Stability properties of bonded SPP-HILIC materials tested with benzyltrimethylammonium chloride as a silanol marker for leaching of the ligand

| Type | Initial retention time (min) | Final retention time (min) | Percent change - retention time drift |
|---|---|---|---|
| Commercial Silica | 14.668 | 15.552 | 6.0 |
| Commercial Zwitterion | 7.263 | 7.491 | 3.0 |
| New, bonded, stabilized, zwitterionic SPP material | 2.090 | 2.092 | 0.1 |
| New, bonded, stabilized, oligosaccharide SPP material | 6.139 | 6.136 | 0.0 |

Figure 11:
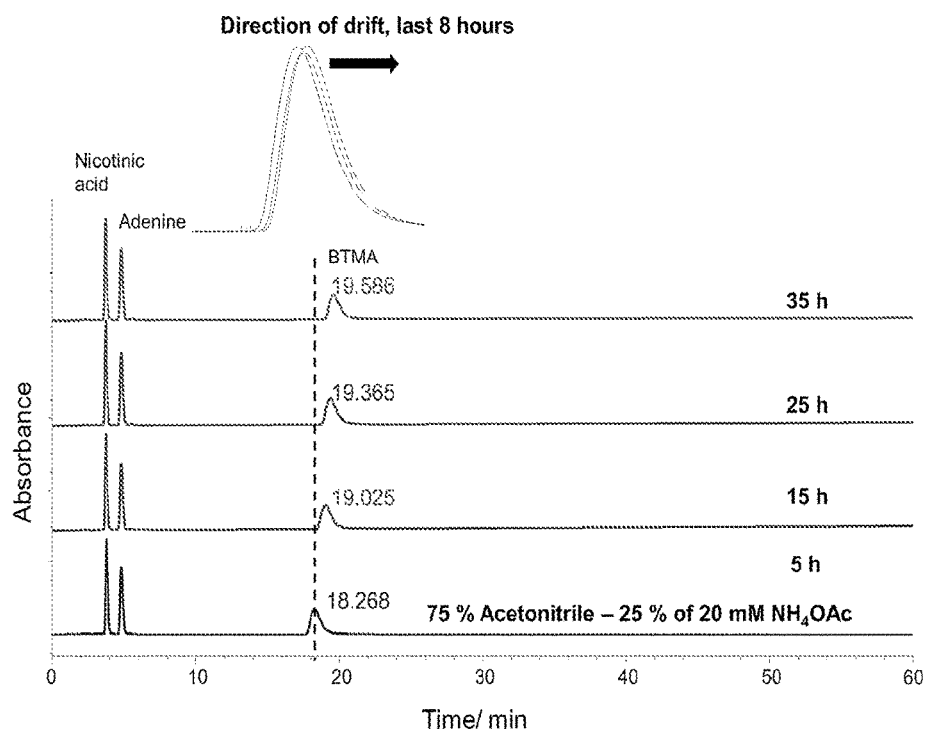
FIG. 11: retention time drift of bare SPP silica.
Figure 12:
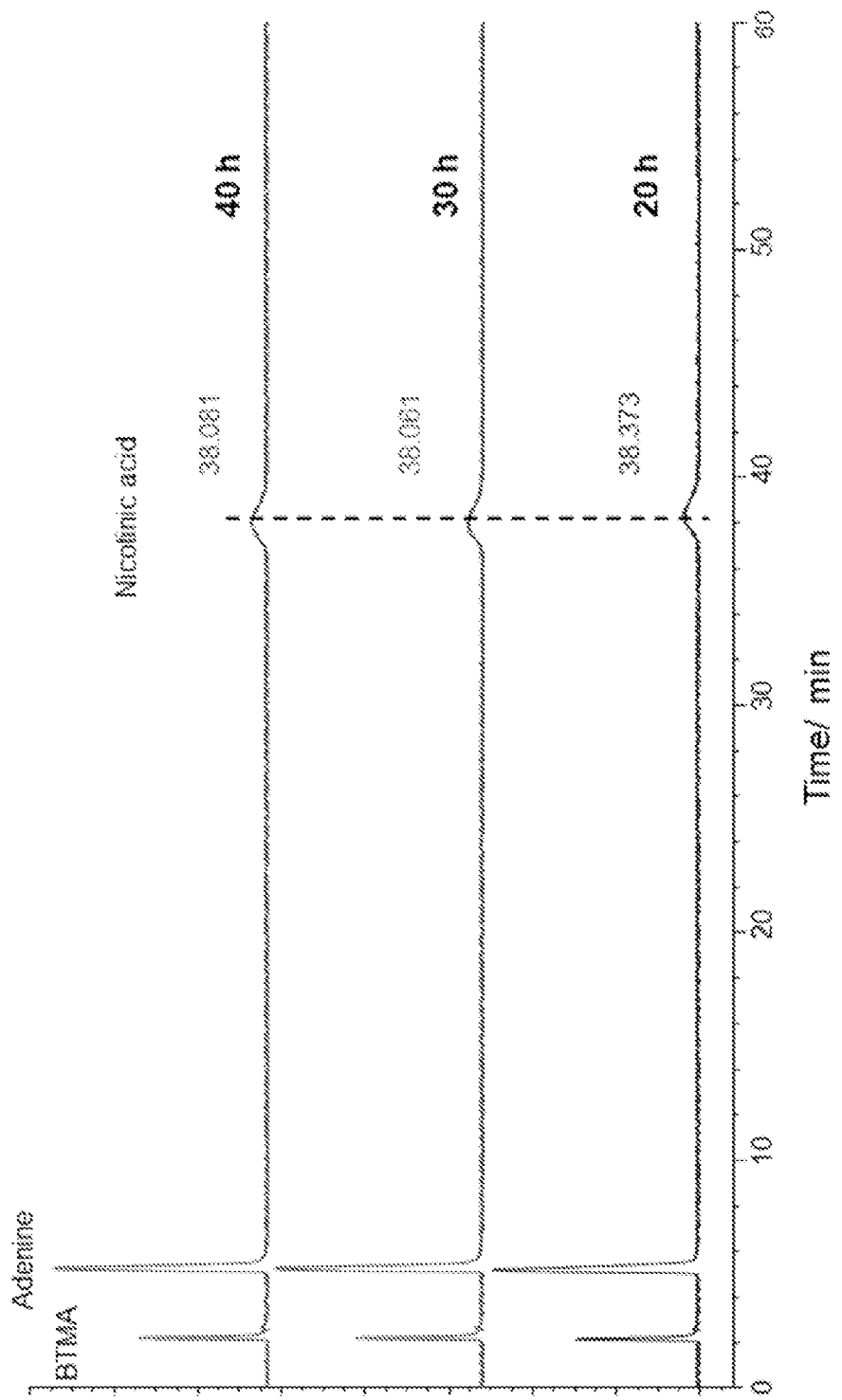
FIG. 12: retention time drift when using non-conventional silanes to form hydrolytically stable, high efficiency, bonded zwitterionic SPP HILIC phases.
Figure 13:
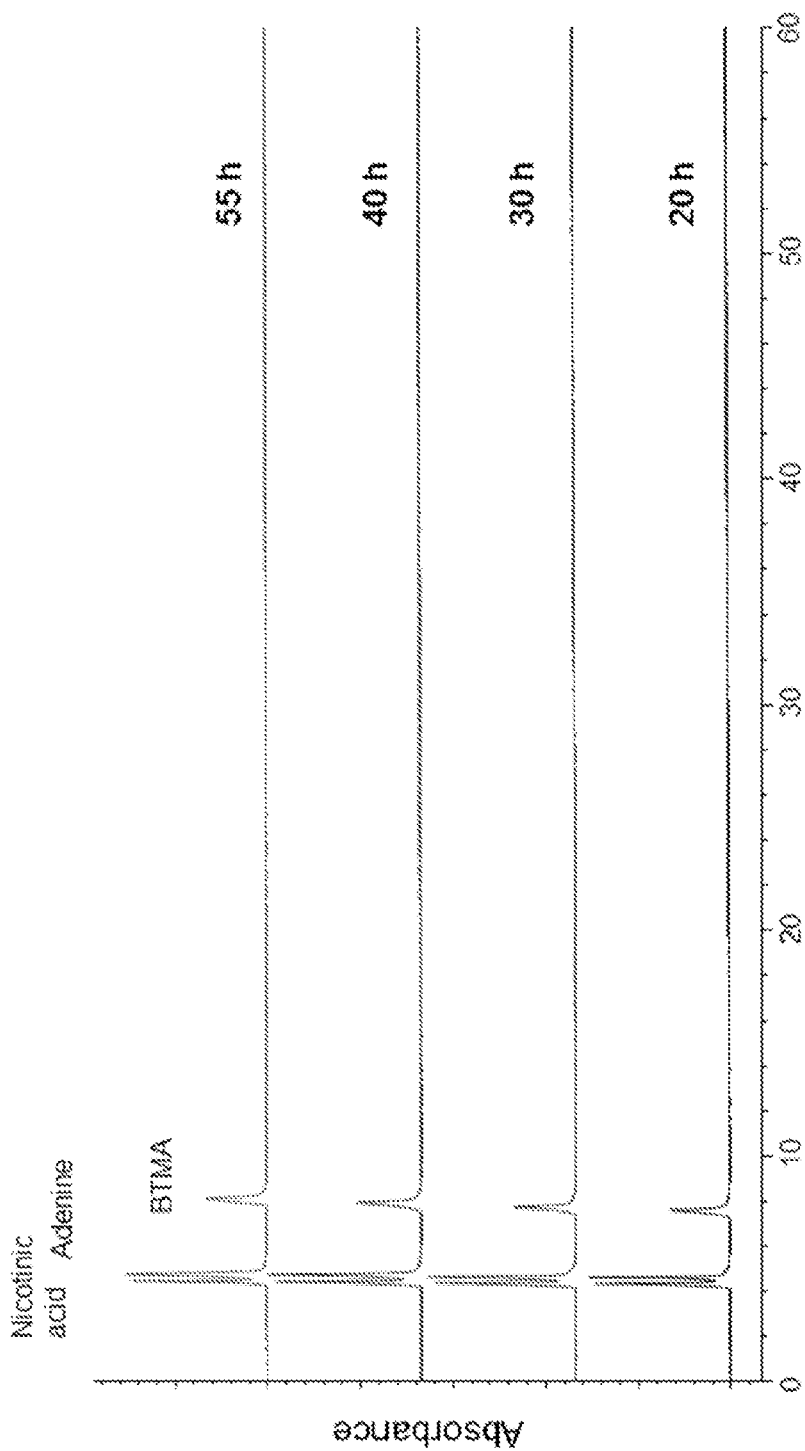
FIG. 13: retention time drift when using multipoint attachment to form hydrolytically stable, high efficiency, bonded ionic, derivatized cyclofructan, SPP HILIC phases.

FIGS. 11-13 provide additional representative data indicating the success of our "stability strategy". FIG. 11 shows the retention time drift of bare SPP silica. FIG. 12 shows an example of the use of non-conventional silanes to form hydrolytically stable, high efficiency, bonded zwitterionic SPP HILIC phases. FIG. 13 shows an example of the use of multipoint attachment to form hydrolytically stable, high efficiency, bonded ionic, derivatized cyclofructan, SPP HILIC phases.

Table 3 lists some particle properties and surface coverage data for native CF6 bonded to FPPs and SPPs to serve as a model example for such stable bonded HILIC selectors. Note the much lower surface area for the SPP compared to the FPP. Yet, an equivalent relative coverage (i.e. µmol/m$^2$) of HILIC selector is obtained on the SPPs.

TABLE 3

Example of particle properties and elemental analysis for stable HILIC phases produced on FPPs and SPPs.

| | Particle diameter (µm) | Porosity % | Pore size (Å) | Surface Area (m$^2$/g) | CF6 content (µmol/m$^2$)[1] | CF6 content (mass %)[1] |
|---|---|---|---|---|---|---|
| FPP 5 µm | 4.3 | 100% | 93 | 465 | 0.72 | 32.2 |
| FPP 3 µm | 3.0 | 100% | 100 | 300 | 0.91 | 27.9 |
| SPP 2.7 µm | 2.7 | 75% | 120 | 120 | 0.86 | 12.8 |

[1]Values calculated starting with the % C measured by elemental analysis.

According to the invention, SPPs have pore size ranging from about 100 angstroms to about 300 angstroms, preferably from about 100 angstroms to about 150 angstroms, more preferably from about 110 angstrom to about 130 angstrom. SPP according to the invention includes a pore size of about 120 angstrom. Also, according to the invention, SPPs have surface area ranging from about 100 m$^2$/g to about 500 m$^2$/g, preferably from about 100 m$^2$/g to about 400 m$^2$/g, or from about 100 m$^2$/g to about 300 m$^2$/g, or from about 100 m$^2$/g to about 200 m$^2$/g, more preferably from about 110 m$^2$/g to about 150 m$^2$/g. SPP according to the invention has a surface area of about 120 m$^2$/g The following paragraphs with their respective figures describe examples of the superiority of SPP-HILIC based stable, bonded materials in producing separations of greater efficiency (higher theoretical plate number (N) and shorter retention (analysis times).

Figure 14:
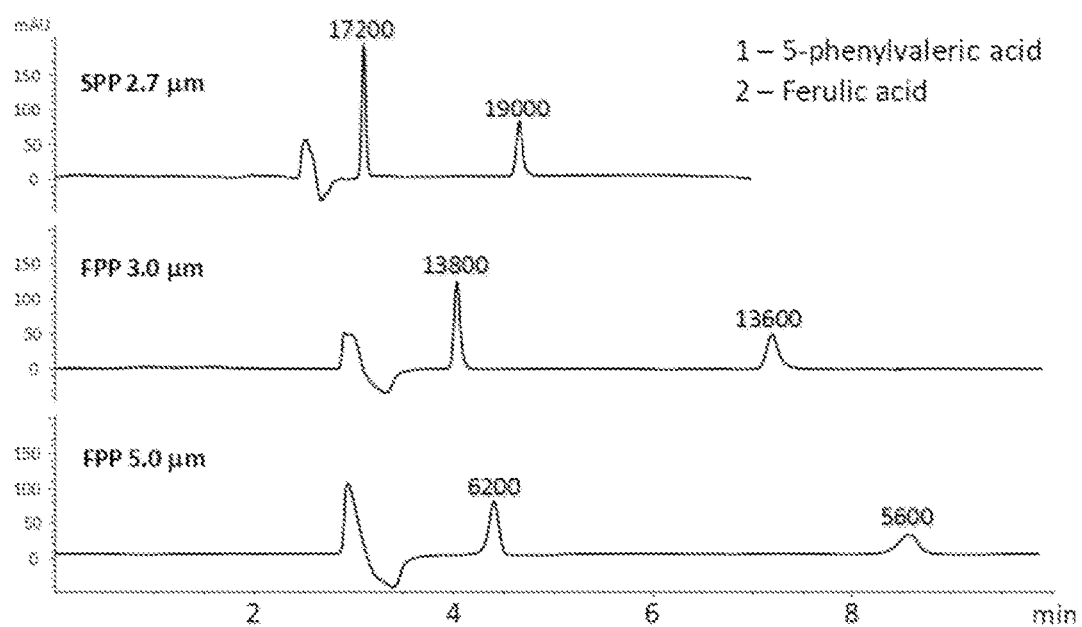
FIG. 14: separation of the polar analytes 5-phenylvaleric acid and ferulic acid in HILIC.

FIG. 14 shows the separation of the polar analytes 5-phenylvaleric acid and ferulic acid in HILIC using a stabilized, bonded, HILIC selector based on cyclofructan 6. The example shows a comparison of separations obtained when the stabilized phase is bound to FPPs and SPPs. The values on the top of the peaks correspond to the efficiency in terms of number of plates (N) on column. The mobile phase was composed of ACN/25 mM NH$_4$OAc (85/15); flow rate=750 µL/min; T=30° C. Note the equivalent resolution observed in all three chromatograms, while the separation using the SPP-HILIC phase was complete in a much shorter time. Such an advantage is a result of the increased efficiency afforded by the SPPs, without a concomitant loss of selectivity.

Figure 15:
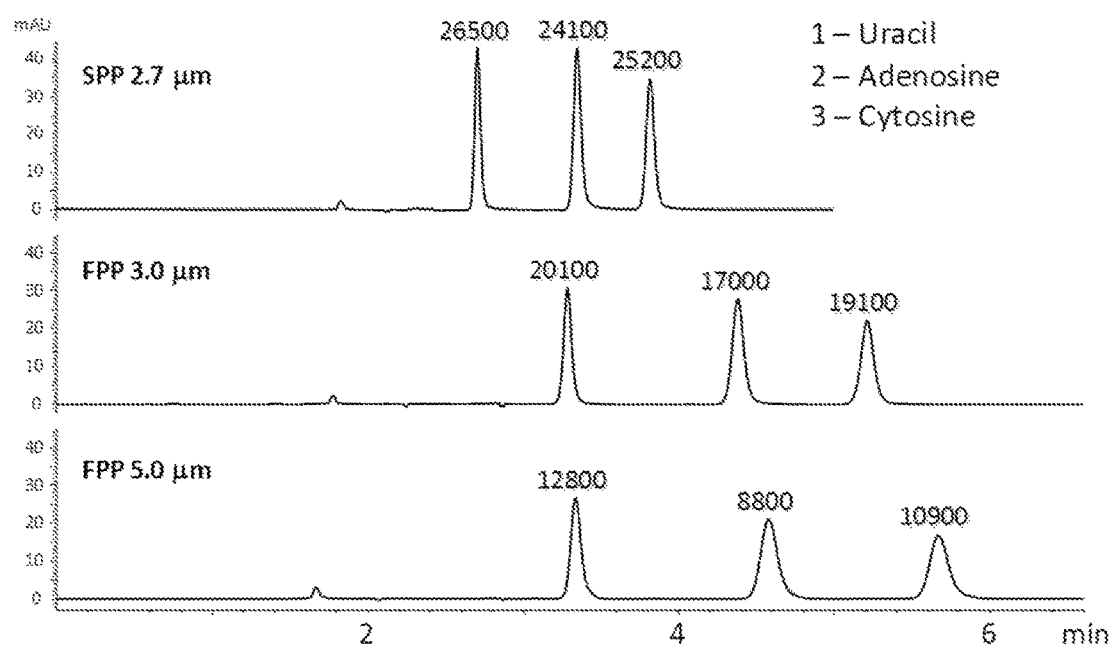
FIG. 15: separation of polar nucleobases (uracil and cytosine) and nucleosides (adenosine) in HILIC using a stabilized, bonded, HILIC selector based on cyclofructan 6.

FIG. 15 shows the separation of polar nucleobases (uracil and cytosine) and nucleosides (adenosine) in HILIC using a stabilized, bonded, HILIC selector based on cyclofructan 6. The example shows a comparison of separations obtained when the stabilized phase is bound to FPPs and SPPs. The values on the top of the peaks correspond to the efficiency in terms of number of plates (N) on column. The mobile phase was composed of ACN/25 mM NH$_4$OAc (75/25); flow rate=750 µL/min; T=30° C. Note the equivalent resolution observed in all three chromatograms, while the separation using the SPP-HILIC phase was complete in a much shorter time. Such an advantage is a result of the increased efficiency afforded by the SPPs, without a concomitant loss of selectivity.

Figure 16:
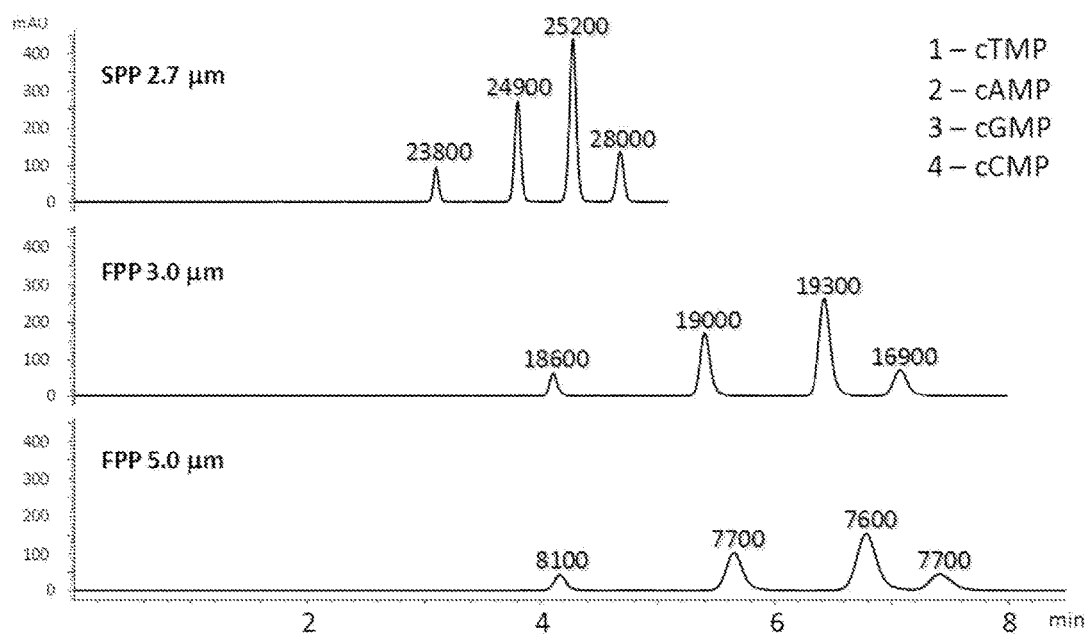
FIG. 16: separation of polar cyclic nucleotides in HILIC.

FIG. 16 shows the separation of polar cyclic nucleotides in HILIC using a stabilized, bonded, HILIC selector based on cyclofructan 6. The example shows a comparison of separations obtained when the stabilized phase is bound to FPPs and SPPs. The values on the top of the peaks correspond to the efficiency in terms of number of plates (N) on column. The mobile phase was composed of ACN/25 mM NH$_4$OAc (70/30); flow rate=750 µL/min; T=30° C. Note the equivalent/improved resolution observed when using the SPP-HILIC phase. Also, the separation using the SPP-HILIC phase was complete in a much shorter time. Such an advantage is a result of the increased efficiency afforded by the SPPs, without a concomitant loss of selectivity.

Figure 17:
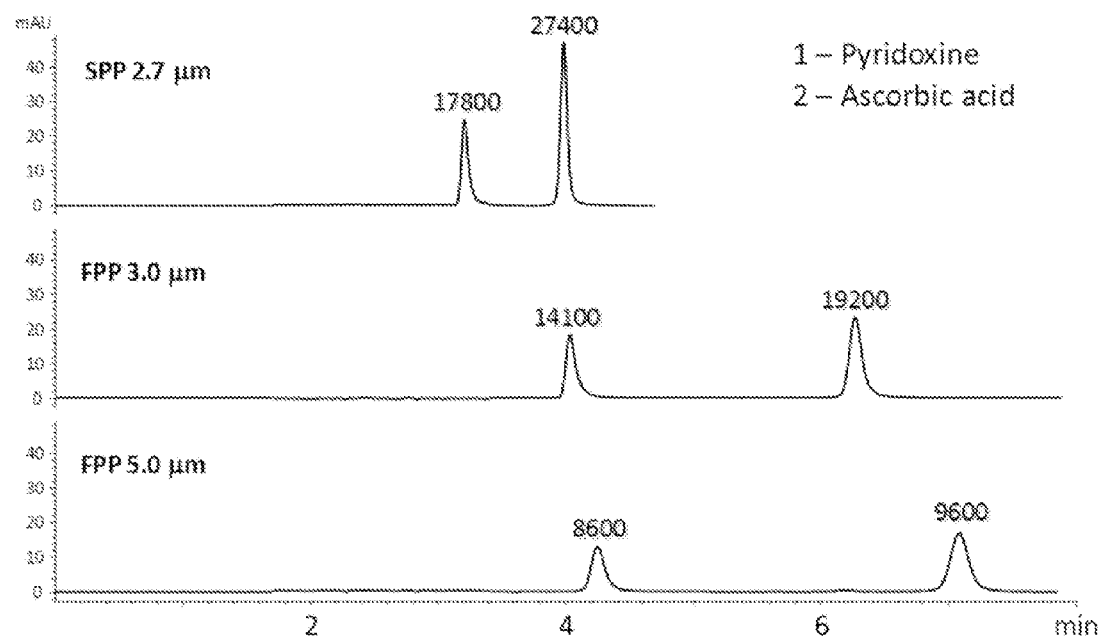
FIG. 17: separation of polar analytes pyridoxine and ascorbic acid in HILIC.

FIG. 17 shows the separation of the polar analytes pyridoxine and ascorbic acid in HILIC using a stabilized, bonded, HILIC selector based on cyclofructan 6. The example shows a comparison of separations obtained when the stabilized phase is bound to FPPs and SPPs. The values on the top of the peaks correspond to the efficiency in terms of number of plates (N) on column. The mobile phase was composed of ACN/25 mM NH$_4$OAc (75/25); flow rate=750 µL/min; T=30° C. Note the equivalent resolution observed in all three chromatograms, while the separation using the SPP-HILIC phase was complete in a much shorter time. Such an advantage is a result of the increased efficiency afforded by the SPPs, without a concomitant loss of selectivity.

Figure 18:
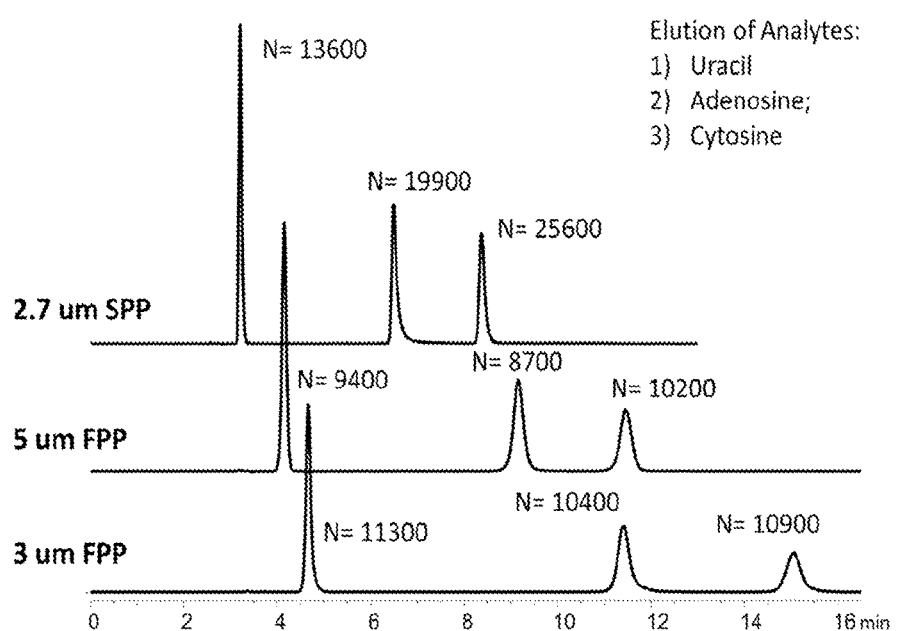
FIG. 18: separation of polar nucleobases (uracil and cytosine) and nucleosides (adenosine) in HILIC using a stabilized, bonded, HILIC selector based on cyclodextrin.

FIG. 18 shows separation of polar nucleobases (uracil and cytosine) and nucleosides (adenosine) in HILIC using a stabilized, bonded, HILIC selector based on cyclodextrin. The example shows a comparison of separations obtained when the stabilized phase is bound to FPPs and SPPs. The values next to each peak correspond to the efficiency in terms of number of plates (N) on column. The mobile phase was composed of ACN/25 mM NH$_4$OAc (90/10); flow rate=750 µL/min; T=25° C. Note the equivalent resolution observed in all three chromatograms, while the separation using the SPP-HILIC phase was complete in a much shorter time. Such an advantage is a result of the increased efficiency afforded by the SPPs, without a concomitant loss of selectivity.

Figure 19:
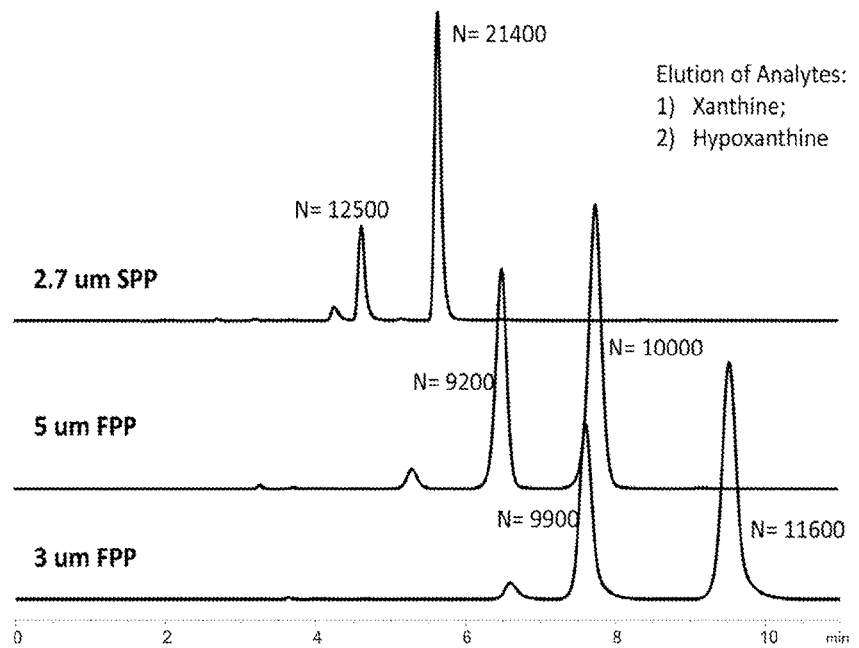
FIG. 19: separation of polar xanthines in HILIC.

FIG. 19 shows separation of polar xanthines (xanthine and hypoxanthine) in HILIC using a stabilized, bonded, HILIC selector based on cyclodextrin. The example shows a comparison of separations obtained when the stabilized phase is bound to FPPs and SPPs. The values next to each peak correspond to the efficiency in terms of number of plates (N) on column. The mobile phase was composed of ACN/25 mM NH$_4$OAc (90/10); flow rate=750 µL/min; T=25° C. Note the equivalent resolution observed in all three chromatograms, while the separation using the SPP-HILIC phase was complete in a much shorter time. Such an advantage is a result of the increased efficiency afforded by the SPPs, without a concomitant loss of selectivity.

Figure 20:
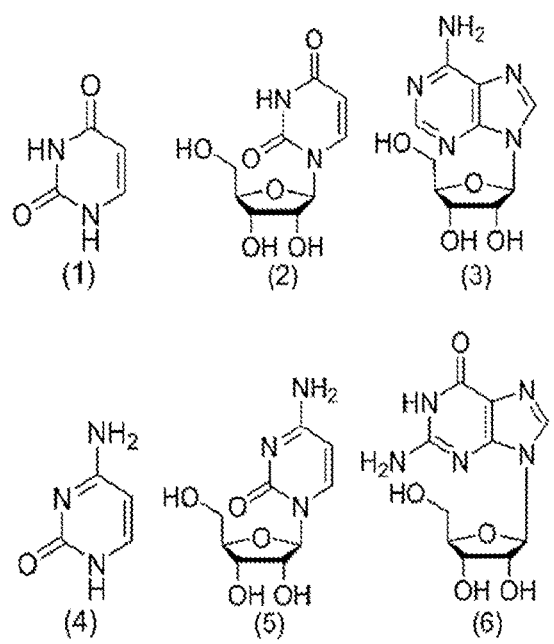
FIG. 20: separation of polar nucleosides and nucleobases in HILIC using a stabilized, bonded, ionic HILIC selector based on benzoic acid functionalized cyclofructan.
Figure 20:
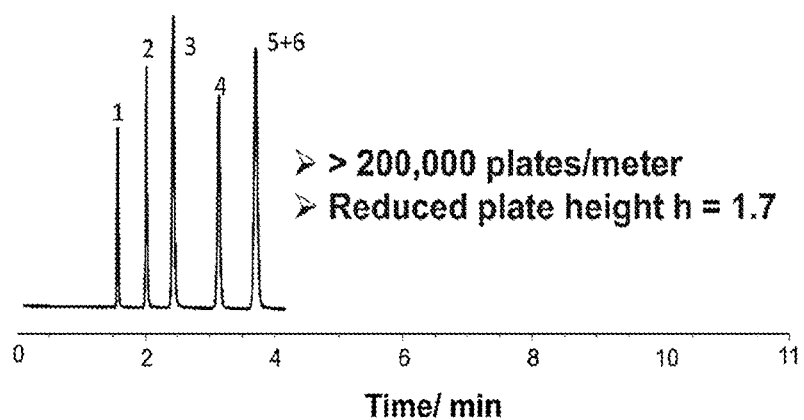

FIG. 20 shows separation of polar nucleosides and nucleobases in HILIC using a stabilized, bonded, ionic HILIC selector based on benzoic acid functionalized cyclofructan. The example shows the extremely high efficiency obtained when the stabilized phase is bound to SPPs. The mobile phase was composed of CAN/10 nM NH$_4$OAc (85/15); flow rate=1.5 mL/min; T=25° C. Also note that the reduced plate height of 1.7 is the best ever found for a HILIC separation.

Figure 21:
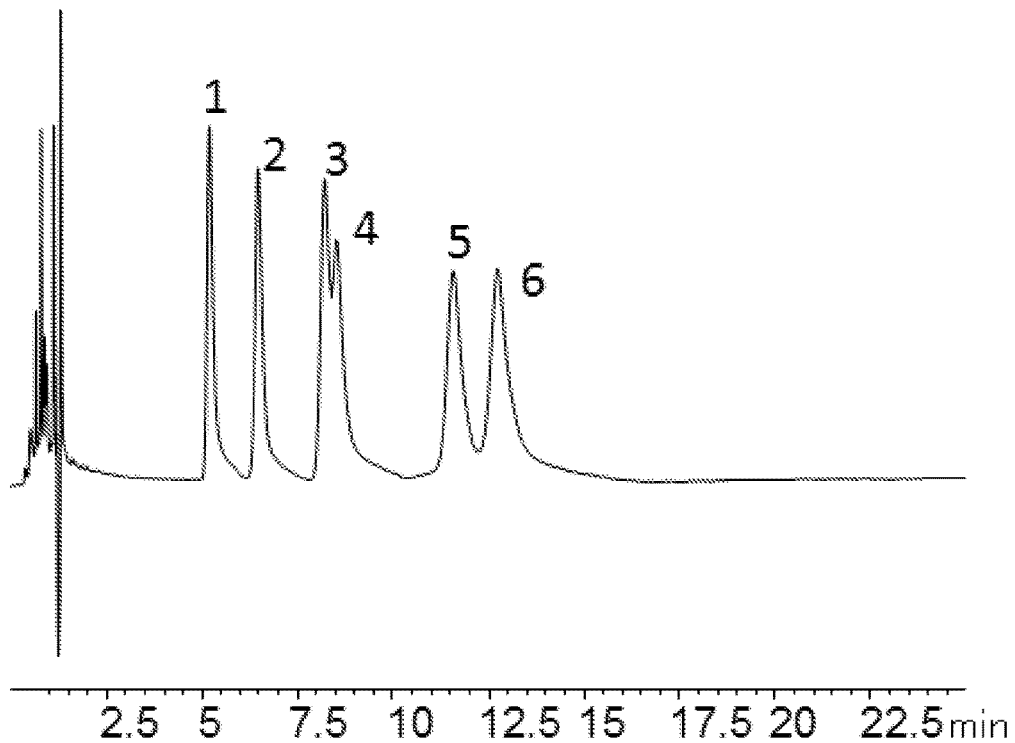
FIG. 21: separation of polar peptides (enkephalins) with single amino acid polymorphisms in HILIC using a stabilized, bonded, macrocyclic gylcopeptide HILIC selector based on teicoplanin.

FIG. 21 shows separation of polar peptides (enkephalins) with single amino acid polymorphisms in HILIC using a stabilized, bonded, macrocyclic glycopeptide zwitterionic HILIC selector based on teicoplanin. The example shows the extremely high efficiency obtained when the stabilized phase is bound to SPPs. The mobile phase was composed of ACN/water (80/20); flow rate=1.0 mL/min; T=25° C.

Figure 22:
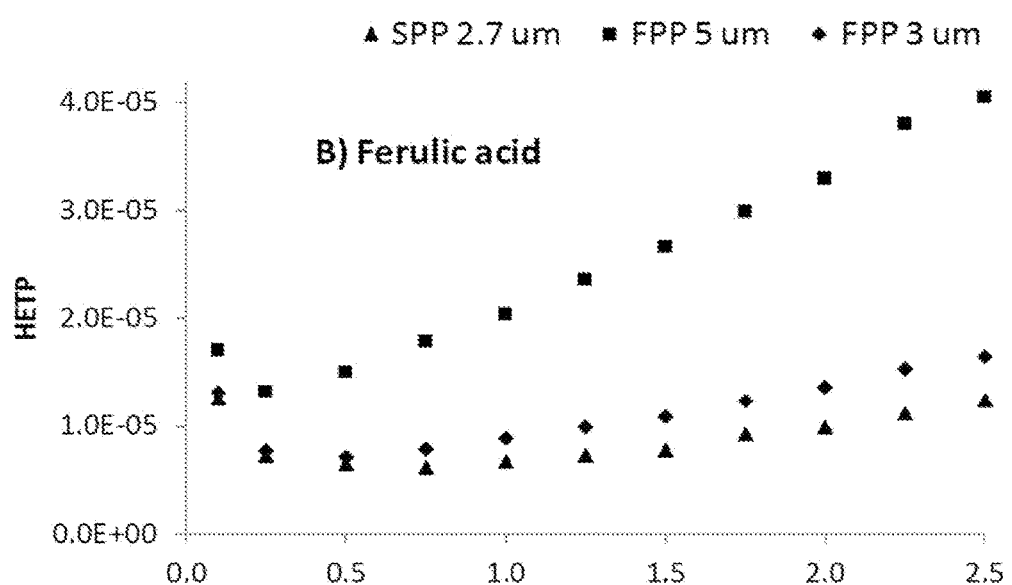
FIG. 22: dependence of efficiency on the flow rate of the mobile phase for ferulic acid in normal phase mode.
Figure 23:
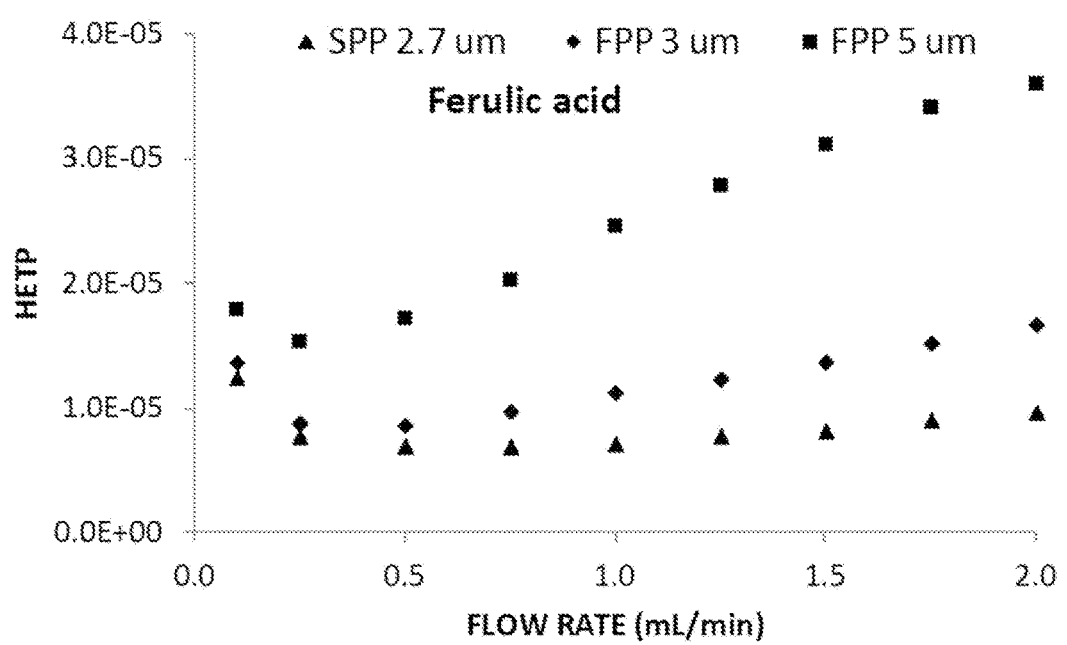
FIG. 23: dependence of efficiency on the flow rate of the mobile phase for ferulic acid in HILIC.
Figure 24:
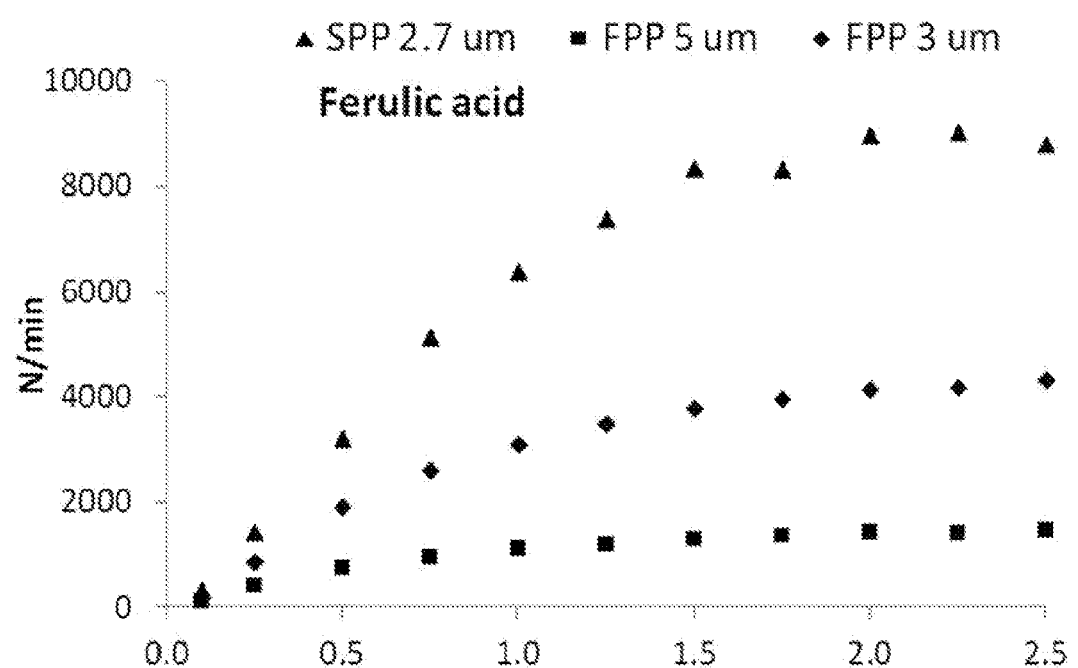
FIG. 24: dependence of plate numbers per minute on the flow rate of the mobile phase for ferulic acid in HILIC.

Another way to demonstrate the advantages of stable HILIC SPP columns is via kinetic plots (van Deemter and related plots). FIGS. 22 and 23 show van Deemter plots for an ultra stable HILIC SPP stationary phase (based on cyclofructan 6) compared to 2 analogous fully porous particle stationary phases in both the HILIC mode and the classic normal phase mode respectively. Note that the SPP stationary phase produces the lowest HETP (or H) curve at all flow rates and has the smallest slope at higher flow rates. Consequently these SPP phases produce the greatest number of theoretical plates (N) per minute (FIG. 24). Thus analyses can be completed in less time on these phases.

More particularly, FIG. 22 shows the dependence of efficiency (in terms of HETP) on the flow rate of the mobile phase for ferulic acid in normal phase mode using a stabilized, bonded, selector based on cyclofructan 6. The example shows a comparison of FPPs and SPPs. As can be seen, the minimum HETP was at higher flow rates for the SPP material. At all tested flow rates, the efficiency of the SPP column was the greatest among the tested columns and the SPP column showed a notable improvement in the mass transfer band broadening effect at high flow rates.

FIG. 23 shows the dependence of efficiency (in terms of HETP) on the flow rate of the mobile phase for ferulic acid in HILIC using a stabilized, bonded, HILIC selector based on cyclofructan 6. The example shows a comparison of FPPs and SPPs. As can be seen, the minimum HETP was at higher flow rates for the SPP material. At all tested flow rates, the efficiency of the SPP column was the greatest among the tested columns and the SPP column showed an improvement in the mass transfer band broadening effect at high flow rates.

FIG. 24 shows the dependence of plate numbers per minute on the flow rate of the mobile phase for ferulic acid in HILIC using a stabilized, bonded, HILIC selector based on cyclofructan 6. The example shows a comparison of FPPs and SPPs. It should be noted that, the SPP column leads to a decrease in the total analysis time. This example clearly shows this, by displaying the number of plates per unit time versus the mobile phase flow rate for each compound. As can be seen, the number of plates afforded per time spent on the analysis is much higher for the SPP columns than the FPPs columns.

Figure 25:
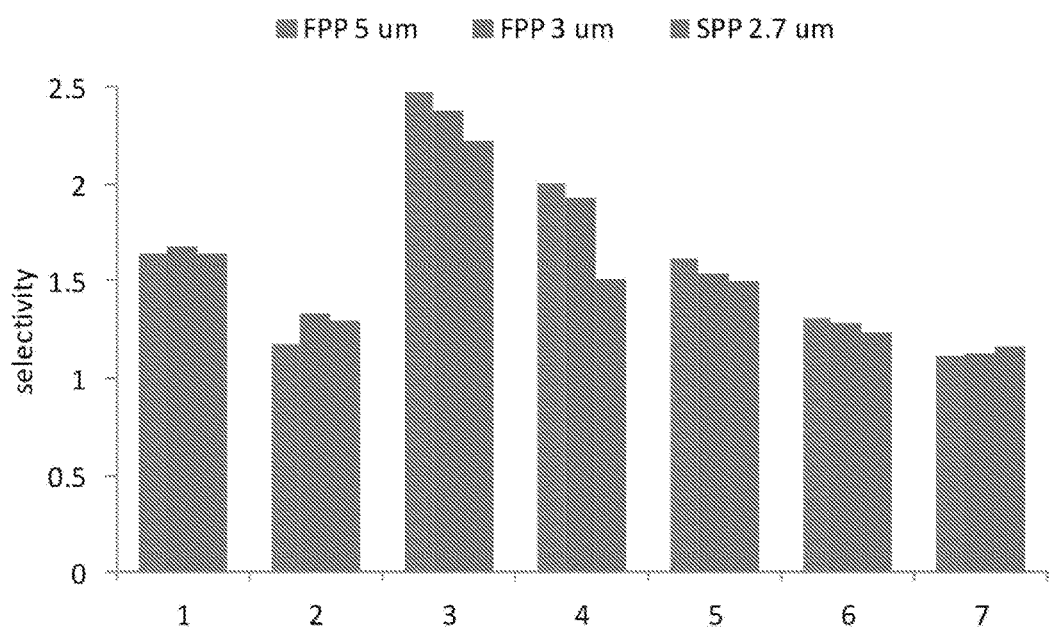
FIG. 25: selectivity values of neighboring peaks for all the analytes separated in FIGS. 14-17 in HILIC.

Finally, FIG. 25 shows selectivity values of neighboring peaks for all the analytes separated in FIGS. 14-17 in HILIC using a stabilized, bonded, HILIC selector based on cyclofructan 6. The example shows a comparison of FPPs and SPPs and the selectivity values were calculated based on the following pairs of separated analytes: 1) uracil-adenosine; 2) adenosine-cytosine; 3) 5-phenylvaleric acid-ferulic acid; 4) pyridoxine ascorbic acid; 5) cTMP-cAMP; 6) cAMP-cGMP; 7) cGMP-cCMP. It can be seen, selectivity values are essentially the same between the FPP and SPP columns. Clearly, selectivity does not follow the absolute mass % loading of CF6 in the column (Table 2). This invention shows, for the first time, that for stabilized, bonded, HILIC phases on SPPs, having an equivalent relative coverage (µmol/m$^2$) will yield equivalent selectivities.

The following are some embodiments according to the present invention.

Embodiment 1. Covalently bonded ultra-stable hydrophilic interaction chromatography (HILIC) phases comprising superficially porous particle (SPP) linked to a HILIC selector.

Embodiment 2. The covalently bonded ultra-stable hydrophilic interaction chromatography (HILIC) phases of embodiment 1, wherein SPP has a particle diameter from about 0.5 microns to about 20 microns.

Embodiment 3. The covalently bonded ultra-stable hydrophilic interaction chromatography (HILIC) phases of embodiment 1, wherein SPP has a particle diameter from about 1.3 microns to about 10 microns.

Embodiment 4. The covalently bonded ultra-stable hydrophilic interaction chromatography (HILIC) phases of embodiment 1, wherein SPP has a particle diameter from about 1.7 microns to about 5.0 microns.

Embodiment 5. The covalently bonded ultra-stable hydrophilic interaction chromatography (HILIC) phases of embodiment 1, wherein SPP has a particle diameter selected from the group consisting of about 1.7, about 2.7 and about 4.0 microns.

Embodiment 6. The covalently bonded ultra-stable hydrophilic interaction chromatography (HILIC) phases of embodiment 1, wherein SPP has a particle diameter of about 1.7 microns.

Embodiment 7. The covalently bonded ultra-stable hydrophilic interaction chromatography (HILIC) phases of embodiment 1, wherein SPP has a particle diameter of about 2.7 microns.

Embodiment 8. The covalently bonded ultra-stable hydrophilic interaction chromatography (HILIC) phases of embodiment 1, wherein the SPP has a particle diameter of about 4.0 microns.

Embodiment 9. The covalently bonded ultra-stable hydrophilic interaction chromatography (HILIC) phases of embodiment 1, wherein the SPP has a pore size from about 100 angstroms to about 300 angstroms.

Embodiment 10. The covalently bonded ultra-stable hydrophilic interaction chromatography (HILIC) phases of embodiment 1, wherein the SPP has a pore size from about 100 angstroms to about 150 angstroms.

Embodiment 11. The covalently bonded ultra-stable hydrophilic interaction chromatography (HILIC) phases of embodiment 1, wherein the SPP has a pore size from about 110 angstroms to about 130 angstroms.

Embodiment 12. The covalently bonded ultra-stable hydrophilic interaction chromatography (HILIC) phases of embodiment 1, wherein the SPP has a pore size of about 120 angstroms.

Embodiment 13. The covalently bonded ultra-stable hydrophilic interaction chromatography (HILIC) phases of embodiment 1, wherein the SPP has a surface area from about 150 m$^2$/g to about 500 m$^2$/g.

Embodiment 14. The covalently bonded ultra-stable hydrophilic interaction chromatography (HILIC) phases of embodiment 1, wherein the SPP has a surface area of about 120 m$^2$/g.

Embodiment 15. The covalently bonded ultra-stable hydrophilic interaction chromatography (HILIC) phases of embodiment 1, wherein the HILIC selector is selected from the group consisting carbohydrates and derivatives, oligosaccharides and derivatives, cyclic and derivatives oligosaccharides, peptides and derivatives, glycopeptides and derivatives, macrocyclic glycopeptides and derivatives, charged or ionic type and zwitterionic type.

Embodiment 16. The covalently bonded ultra-stable hydrophilic interaction chromatography (HILIC) phases of embodiment 15, wherein the HILIC selector is selected from the group consisting cyclodextrins, derivatized cyclodextrin, cyclofructans, derivatized cyclofructans, teicoplanin, vancomycin, teicoplanin aglycone, ristocetin A, dalbavancin, boromycin, sulfonated cyclofrutans, sulfonated cyclodextrins, and 3-P,P-diphenylphosphoniumpropylsulfonate.

Embodiment 17. The covalently bonded ultra-stable hydrophilic interaction chromatography (HILIC) phases of embodiment 1, wherein the HILIC selector is selected from the group consisting of native or derivatized cyclofrutans, native or derivatized cyclodextrins, Embodiment 18. The covalently bonded ultra-stable hydrophilic interaction chromatography (HILIC) phases of embodiment 17, wherein derivatizing groups of the derivatized cyclofrutans and the derivatized cyclodextrins are selected from the group consisting of linear alkane $C_1$-$C_{30}$, branched alkane $C_1$-$C_{30}$, unsaturated alkane $C_1$-$C_{30}$, cyclic alkane $C_1$-$C_{30}$, linear and/or cyclic alkane containing heteroatoms (e.g. N, S, O) $C_1$-$C_{30}$)

Embodiment 19. The covalently bonded ultra-stable hydrophilic interaction chromatography (HILIC) phases of embodiment 1, wherein the superficially porous particle (SPP) is linked to a HILIC selector via ether, carbamate, thioether, thiocarbamate, ester, triazole, or urea linkages.

Embodiment 20. The covalently bonded ultra-stable hydrophilic interaction chromatography (HILIC) phases of embodiment 1, wherein the retention time drift is less than 3.0% change.

Embodiment 21. The covalently bonded ultra-stable hydrophilic interaction chromatography (HILIC) phases of claim 1, wherein the retention time drift is less than 1.0% change.

Embodiment 22. A superficially porous particle (SPP) comprising high efficiency, ultra-stable hydrophilic interaction chromatography (HILIC) matrix covalently bonded thereto.

Embodiment 23. The superficially porous particle (SPP) of embodiment 22, wherein the matrix comprises HILIC selector.

Embodiment 24. Hydrolytically stable, highly selective superficially porous particle (SPP) hydrophilic interaction liquid chromatography (HILIC) stationary phases having higher efficiencies and shorter retention times than analogous stationary phases on fully porous particles (FPP).

Embodiment 25. The hydrolytically stable highly selective SPP HILIC phases of embodiment 3, wherein the HILIC packing material is not unmodified silica thereby protecting the SPP surface from dissolution and having broader HILIC selectivity and higher efficiencies than bare supports and fully porous supports comprising silica.

Embodiment 26. A method for separation of polar molecules comprising contacting a molecule with covalently bonded ultra-stable hydrophilic interaction chromatography (HILIC) phases comprising superficially porous particle (SPP) linked to a HILIC selector.

Embodiment 27. A method of making ultra-stable hydrophilic interaction chromatography (HILIC) phases comprising superficially porous particle (SPP) linked to a HILIC selector comprising selecting a HILIC selector selected from the group consisting of cyclodextrins, derivatized cyclodextrin, cyclofructans, derivatized cyclofructans, teicoplanin, vancomycin, teicoplanin aglycone, ristocetin A, dalbavancin, boromycin, sulfonated cyclofrutans, sulfonated cyclodextrins, and 3-P,P-diphenylphosphoniumpropylsulfonate; and covalently bonding the chiral selector to a superficially porous particle, thereby obtaining ultra stable HILIC SPP stationary phase.

Although the preferred embodiments of the present invention have been described herein, the descriptions are merely illustrative. Further modification of the invention herein disclosed will occur to those skilled in the respective arts and all such modifications are deemed to be within the scope of the invention as defined by the attached claims.

What is claimed:

1. Covalently bonded ultra-stable hydrophilic interaction chromatography (HILIC) phases comprising a superficially porous particle (SPP) support linked to a nonpolymeric HILIC selector via ether, carbamate, thioether, thiocarbamate, ester, triazole, or urea linkages, wherein the nonpolymeric HILIC selector is selected from the group consisting of carbohydrates and derivatives, oligosaccharides and derivatives, cyclic and derivatives oligosaccharides, peptides and derivatives, glycopeptides and derivatives, macrocyclic glycopeptides and derivatives, charged or ionic type, and zwitterionic type.

2. The covalently bonded ultra-stable hydrophilic interaction chromatography (HILIC) phases of claim 1, wherein SPP has a particle diameter from about 0.5 microns to about 20 microns.

3. The covalently bonded ultra-stable hydrophilic interaction chromatography (HILIC) phases of claim 1, wherein SPP has a particle diameter from about 1.3 microns to about 10 microns.

4. The covalently bonded ultra-stable hydrophilic interaction chromatography (HILIC) phases of claim 1, wherein SPP has a particle diameter from about 1.7 microns to about 5.0 microns.

5. The covalently bonded ultra-stable hydrophilic interaction chromatography (HILIC) phases of claim 1, wherein SPP has a particle diameter selected from the group consisting of about 1.7, about 2.7 and about 4.0 microns.

6. The covalently bonded ultra-stable hydrophilic interaction chromatography (HILIC) phases of claim 1, wherein the SPP has a pore size from about 100 angstroms to about 300 angstroms.

7. The covalently bonded ultra-stable hydrophilic interaction chromatography (HILIC) phases of claim 1, wherein the SPP has a pore size of about 120 angstroms.

8. The covalently bonded ultra-stable hydrophilic interaction chromatography (HILIC) phases of claim 1, wherein the SPP has a surface area from about 100 m$^2$/g to about 500 m$^2$/g.

9. The covalently bonded ultra-stable hydrophilic interaction chromatography (HILIC) phases of claim 1, wherein the SPP has a surface area of about 120 m$^2$/g.

10. The covalently bonded ultra-stable hydrophilic interaction chromatography (HILIC) phases of claim 1, wherein the HILIC selector is selected from the group consisting cyclodextrins, derivatized cyclodextrin, cyclofructans, derivatized cyclofructans, teicoplanin, vancomycin, teicoplanin aglycone, ristocetin A, dalbavancin, boromycin, sulfonated cyclofructans, sulfonated cyclodextrins, and 3-P,P-diphenylphosphoniumpropylsulfonate.

11. The covalently bonded ultra-stable hydrophilic interaction chromatography (HILIC) phases of claim 10, wherein the HILIC selector is selected from the group consisting of native or derivatized cyclofructans, native or derivatized cyclodextrins.

12. The covalently bonded ultra-stable hydrophilic interaction chromatography (HILIC) phases of claim 11, wherein derivatizing groups of the derivatized cyclofructans and the derivatized cyclodextrins are selected from the group consisting of linear alkane $C_1$-$C_{30}$, branched alkane $C_1$-$C_{30}$, unsaturated alkane $C_1$-$C_{30}$, cyclic alkane $C_1$-$C_{30}$, linear and/or cyclic alkane containing heteroatoms.

13. The covalently bonded ultra-stable hydrophilic interaction chromatography (HILIC) phases of claim 1, wherein the retention time drift is less than 3.0% change.

14. The covalently bonded ultra-stable hydrophilic interaction chromatography (HILIC) phases of claim 1, wherein the retention time drift is less than 1.0% change.

15. A superficially porous particle (SPP) comprising high efficiency, ultra-stable hydrophilic interaction chromatography (HILIC) matrix covalently bonded thereto via ether, carbamate, thioether, thiocarbamate, ester, triazole, or urea linkages, wherein the matrix comprises nonpolymeric HILIC selector selected from the group consisting of cyclodextrins, derivatized cyclodextrin, cyclofructans, derivatized cyclofructans, teicoplanin, vancomycin, teicoplanin aglycone, ristocetin A, dalbavancin, boromycin, sulfonated cyclofructans, sulfonated cyclodextrins, and 3-P,P-diphenylphosphoniumpropylsulfonate.

16. A hydrolytically stable highly selective superficially porous particle (SPP) hydrophilic interaction liquid chromatography (HILIC) phases having higher efficiencies and shorter retention times than analogous stationary phases on fully porous particles (FPP), wherein the HILIC packing material is not unmodified silica thereby protecting the SPP surface from dissolution and having broader HILIC selectivity and higher efficiencies than bare supports and fully porous supports comprising silica.

* * * * *